US006163732A

United States Patent [19]

Petke et al.

[11] Patent Number: 6,163,732

[45] Date of Patent: Dec. 19, 2000

[54] SYSTEM, METHOD AND COMPUTER PROGRAM PRODUCTS FOR DETERMINING COMPLIANCE OF CHEMICAL PRODUCTS TO GOVERNMENT REGULATIONS

[75] Inventors: Frederick David Petke; D. Russell Hickman; William D. Graham, Jr., all of Kingsport, Tenn.

[73] Assignee: Eastman Chemical Company, Kingsport, Tenn.

[21] Appl. No.: 08/989,040

[22] Filed: Dec. 11, 1997

[51] Int. Cl.[7] .......... G06F 19/00

[52] U.S. Cl. .......... 700/106; 700/107; 700/108; 700/109; 700/110

[58] Field of Search .......... 700/90, 108, 109, 700/110, 266, 106, 107; 705/1, 28, 29

[56] References Cited

U.S. PATENT DOCUMENTS

| | | | |
|---|---|---|---|
| 5,664,112 | 9/1997 | Sturgeon et al. | 705/28 |
| 5,726,884 | 3/1998 | Sturgeon et al. | 705/1 |

OTHER PUBLICATIONS

International Search Report, PCT/US98/26286, Mar. 29, 1999.

Barcenas et al., "A System for Tracking Food Components for Labeling and Other Purposes", Food Technology, May 1998, pp. 97–102.

"SHERPA/PIMS—The Cornerstone of Company's Information Enterprise", Industrial Engineering, Apr. 1994, pp. 30–31.

*Primary Examiner*—Paul P. Gordon

*Attorney, Agent, or Firm*—Myers Bigel Sibley & Sajovec

[57] ABSTRACT

Systems, methods and computer program products determine compliance of a chemical product to be manufactured to government regulations that govern the manufactured product. According to the invention, the chemical compositions that are present in the chemical product to be manufactured are ascertained. The chemical compositions so ascertained are compared to a stored set of government regulatory standards related to the chemical compositions to determine compliance. Accordingly, compliance with complex government regulations governing chemical products can be determined.

57 Claims, 12 Drawing Sheets

From Fig. 6A

Is Family sales-restricted ?
610
Yes
No
Does Family / Customer Cross-Reference Exist?
609
No
Yes
Is Customer sales-restricted ?
611
Yes
No
Exception
135
Is Shipment in Compartmental Tank Car / Truck?
620
Yes
No
Are Chemicals Compatible ?
621
No
Yes
Exception
135
Exception ?
622
Yes
No
Modifications
136
Update R&D / Commercial Volume Accumulators
623
To Fig. 6C

SYSTEM, METHOD AND COMPUTER PROGRAM PRODUCTS FOR DETERMINING COMPLIANCE OF CHEMICAL PRODUCTS TO GOVERNMENT REGULATIONS

FIELD OF THE INVENTION

This invention relates to computer integrated manufacturing systems, methods and computer program products, and more particularly to systems, methods and computer program products for chemical product manufacturing.

BACKGROUND OF THE INVENTION

The manufacture of chemical products is becoming increasingly complicated as worldwide demand for chemical products, and the complexity of the products, continue to increase. Modern chemical plants are sprawling complexes, employing hundreds or thousands of employees to manufacture many diverse chemicals.

Computer systems, methods and program products have been widely used for chemical process control. For example, a well known enterprise resource planning computer product is SAP Release 2, which is marketed by SAP AG. SAP, Release 2 can provide automated product sales order entry and can also track manufacturing bills of materials that are used in a chemical plant to manufacture chemical products. Such enterprise resource planning products allow a manufacturer to track orders, inventory and manufacturing operations for a complex chemical plant.

Due to the toxic nature of certain chemicals, the chemical industry is regulated by many national and local laws. For example, in the United States, the Toxic Substances Control Act (TSCA) is a complex set of regulations that govern the manufacture and use of chemicals. Failure to comply with TSCA regulations can result in severe penalties for a chemical manufacturer. Unfortunately, compliance with TSCA and other regulations is becoming increasingly complicated due to the increasing number and complexity of chemical products that are being produced, and the increasing number and complexity of regulations that govern the manufactured products.

SUMMARY OF THE INVENTION

The present invention includes systems, methods and computer program products for determining compliance of a chemical product to be manufactured to government regulations that govern the manufactured product. According to the invention, the chemical compositions that are present in the chemical product to be manufactured are ascertained. The chemical compositions so ascertained are compared to a stored set of government regulatory standards related to the chemical compositions to determine compliance. Accordingly, compliance with complex government regulations governing chemical products can be determined.

The chemical compositions that are present in the chemical product to be manufactured may be ascertained by obtaining a bill of materials comprising the chemical components of the chemical product to be manufactured. The bill of materials may be compared to a "recipe" that is used in a chemical process to manufacture the chemical product. The bill of materials is used to derive the chemical compositions that are present in the manufactured chemical product. The chemical compositions that are present in the chemical product to be manufactured may be ascertained in foreground processing in response to receipt of a customer order for a chemical product. Alternatively, ascertaining the chemical compositions that are present in the chemical product may be performed in background processing, wherein the chemical compositions that are present in a plurality of chemical products that can be manufactured in a chemical plant are ascertained. Then, in response to a customer order for a chemical product selected from the plurality of chemical products, the chemical composition that was ascertained for the selected chemical product is retrieved.

The chemical compositions that are present in the chemical product to be manufactured may be ascertained by identifying a manufacturing bill of materials that is associated with the chemical product and then creating a regulatory bill of materials from the manufacturing bill of materials. More specifically, a manufacturing bill of materials that includes the chemical components of the chemical product to be manufactured is obtained. For each component, a component class to which the component belongs is then assigned. Component classes may be used to allow the compliance determining system to deduce the components of the final chemical product from knowledge of how the components are used in the manufacturing process. Accordingly, the component classes include the class of bases, additives, reactants and monomers and others. Based on the assigned component classes, the chemical compositions are determined. This determination will generally vary based on whether the chemical composition results from a reaction, a mixture or a polymerization.

According to another aspect of the present invention, the chemical product may include impurities that are not part of the chemical product, but are nonetheless important for regulatory purposes. According to this aspect of the invention, impurities may be accounted for in the chemical composition that is ascertained. More specifically, known impurities may be added to the chemical composition of the chemical product. Alternatively, impurities may be added to the bill of materials to represent impurities that are present in the chemical product in addition to the chemical compositions of the manufactured chemical product. Then, the chemical compositions present in the manufactured chemical product that is derived, including the chemical compositions of the impurities.

Having ascertained the chemical compositions that are present in the chemical product to be manufactured, the chemical compositions so ascertained are compared to a stored set of government regulatory standards relating to the chemical compositions to determine compliance. Comparison may be performed by comparing the chemical compositions so ascertained to a stored set of government regulatory standards governing the manufacturing location for the manufactured chemical product. The chemical compositions so ascertained are also compared to a stored set of government regulatory standards governing the destination location for the manufactured chemical product.

Upon completion of the comparison, the chemical product to manufactured may be flagged as complying with all regulations or as noncomplying. If noncomplying, the particular regulations to which the chemical composition does not comply may be flagged. According to another aspect of the invention, modifications may be proposed to noncomplying chemical products, so that the chemical product to be manufactured becomes complying. For example, an expert system may be used that can suggest substitutions for components in mixtures that are not on the inventory of existing substances for the shipped-to country.

The systems, methods and computer program products for ascertaining which chemical compositions are present in a chemical product to be manufactured may be used independent of the systems, methods and computer program products for determining compliance of the chemical product to be manufactured to government regulations that govern the manufactured product. For example, the ascertaining of chemical compositions may be used to determine the total output of a chemical product from a chemical plant. Similarly, comparing chemical compositions to a stored set of government regulatory standards relating to the chemical compositions to determine compliance may take place for a known chemical composition, the composition of which is not ascertained from a manufacturing bill of materials. Accordingly, the ascertaining and comparing aspects of the present invention may be used independently. However, preferably, the ascertaining and comparing aspects of the present invention are used together to provide improved methods, systems and computer program products for determining compliance of a chemical product to manufactured to government regulations that govern the manufactured chemical product.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described using the block diagrams of FIGS. 1–7. It will be understood that each element of the illustrations, and combinations of elements in the illustrations, can be implemented by general and/or special purpose hardware-based systems that perform the specified functions or steps, or by combinations of general and/or special purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer implemented process such that the instructions which execute on the processor provide steps for implementing the functions specified in the illustrations. Accordingly, FIGS. 1–7 support combinations of means for performing the specified functions, combinations of steps for performing the specified functions and program instruction means for performing the specified functions.

Overview Referring now to FIG. 1, an architecture of systems, methods and computer program products for determining compliance of a chemical product to be manufactured to government regulations that govern the manufactured product according to the invention, will now be described. It will be understood that systems, methods and computer program products 100 according to the present invention are preferably implemented as a stored program that executes on a data processing system. A legacy data processing system, such as an IBM Model S/390 may be used. Alternatively, however, midrange or personal system and a network of legacy, midrange and personal systems may be used.

Figure 1:
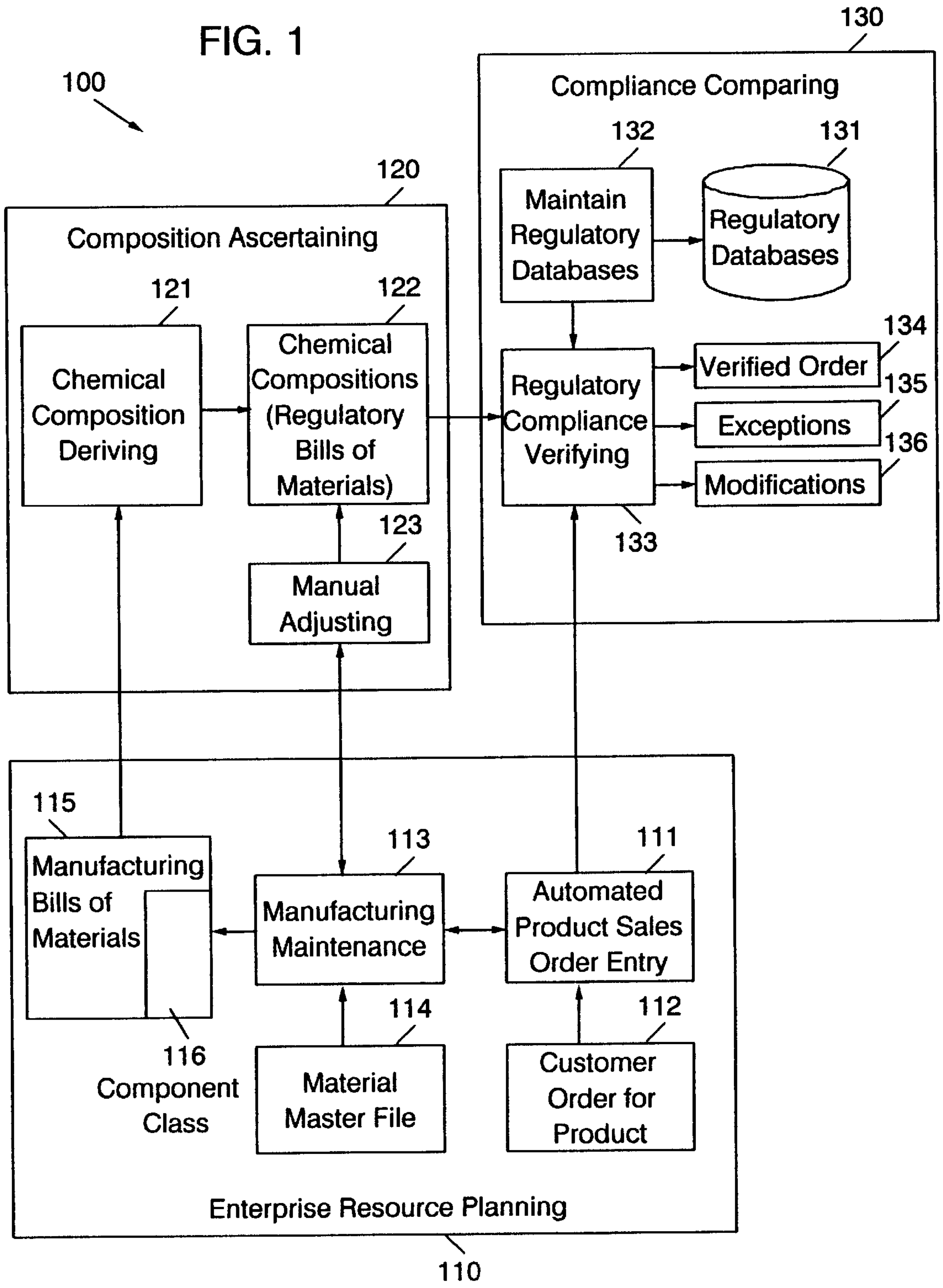
FIG. 1 is a block diagram of systems, methods and computer program products for determining compliance of the chemical product to be manufactured to government regulations that govern the manufactured product, according to the invention.

As also shown in FIG. 1, the present invention may include three major components: enterprise resource planning 110, composition ascertaining 120 and compliance comparing 130. Briefly, enterprise resource planning 110 may be a legacy system that is used for automated product sales order entry and for maintenance of manufacturing bills of materials that are used in chemical product manufacturing. As will be described below, manufacturing bills of materials may be modified to include component classes. An example of an enterprise resource planning system that may be used for component 110 is the aforementioned SAP system.

Composition ascertaining 120 ascertains which chemical compositions are present in the chemical product to be manufactured. As will be described below, the chemical compositions may be ascertained in foreground or background processing. Compliance comparing 130 compares the chemical compositions so ascertained to a stored set of government regulatory standards relating to the chemical compositions to determine compliance.

A more detailed description of enterprise resource planning 110, composition ascertaining 120 and compliance comparing 130 will now be provided. More specifically, enterprise resource planning 110 includes automated product sales order entry 111 that is responsive to a customer order for a product 112. Automated product sales order entry 111 interacts with manufacturing maintenance 113 to provide computer integrated manufacturing, using techniques well known to those having skill in the art. Manufacturing maintenance 113 is responsive to a material master file 114 to create a manufacturing bill of materials (BOM) 115. The manufacturing bill of materials is a list of materials that is used in the chemical manufacturing process to manufacture a product. As will be described below, manufacturing bills of materials according to the present invention include a component class 116 associated with each material component in the manufacturing bill of materials. The component class is used by the composition ascertaining 120 in order to ascertain which chemical compositions are present in the chemical product to be manufactured.

Additional description of composition ascertaining 120 will now be provided. As shown in FIG. 1, chemical composition deriving 121 uses the manufacturing bills of materials 115, including the component classes 116 to derive material chemical compositions, also known as regulatory bills of materials 122 that define the chemical compositions that are present in the chemical product to be manufactured. As will be described in detail below, chemical composition deriving 121 uses the component classes 116 to determine the chemical compositions 122.

Composition ascertaining 120 also includes manual adjusting 123. As will be described below, manual adjusting may be used to account for impurities that may be part of the chemical composition, even though they are not officially part of the manufacturing bill of materials 115. If it is known that impurities are contained in the chemical composition, manual adjusting 123 may be used to add impurities to the chemical composition 122 to account for impurities that are present in the manufactured chemical product. Alternatively, as shown in FIG. 1, manual adjusting may be used to adjust the manufacturing maintenance 113, so that the manufacturing bill of materials 115 also includes the impurities that will be included in the chemical compositions 122.

The chemical compositions (regulatory bills of materials) 122 are provided to compliance comparing 130. Compliance comparing 130 includes regulatory databases 131 that can include a list of regulations that apply to chemical products. The regulatory databases may be maintained 132 by adding new regulations or updating existing regulations. The regulatory databases 131, chemical compositions 122 and customer orders 112 are input to compliance verifying 133.

Compliance verifying 133 compares the chemical compositions 122 to the stored set of government regulatory standards in the regulatory databases 131 for a customer order 112, in order to determine whether the chemical product to be manufactured complies with government regulations that govern the manufactured product. Regulatory compliance verifying 133 can produce a verified order 134 that indicates that the chemical compositions do comply with the applicable government regulations, or may produce an exceptions list 135 that indicate particular chemical compositions and/or regulations that are violated. As another alternative, modifications 136 may be suggested to render the chemical composition complying.

A detailed description of enterprise resource planning 110, composition ascertaining 120 and compliance comparing 130 of compliance determining methods, systems and computer program products 100 will now be provided. In order to provide consistent terminology, definitions will first be provided.

Definitions

The following definitions apply herein unless otherwise specified:

Material: A Material is a substance or article used in or incidental to, the manufacture of other Materials or a Target Material in a chemical manufacturing process.

Target Material: A Target Material, also known as a chemical composition, is a material to be produced by a chemical manufacturing process according to a Manufacturing Bill of Material. A unique Target Material may be differentiated by packaging materials. For example, acetic acid may be a Material but bulk acetic acid, acetic acid in 55 gallon drums, and acetic acid in 1 quart sample jars, are three unique Target Materials.

Manufacturing Bill of Material: This is a list of materials used in a chemical manufacturing process to produce a Target Material. A Manufacturing Bill of Material may also be referred to as a "recipe" that is used in manufacturing. The Materials may chemically react to form a new chemical, or they may form a physical mixture. Alternatively, polymerization may take place. A Manufacturing Bill of Material may also contain materials that do not become part of the final target material, such as solvents and catalysts. A Manufacturing Bill of Material may also contain materials that are used to package the Target Material.

Regulatory Bill of Material, also referred to as a Chemical Composition: This is a list of chemicals present in a Material that are relevant for checking the Material's regulatory compliance. It will be understood that the Chemical Compositions or Regulatory Bills of Material are not true chemical analyses or chemical standards for the Material and generally are not used in assay analyses or other similar processes. Rather, the Regulatory Bill of Material includes only those materials that are relevant for regulatory compliance verifying. Regulatory Bills of Materials are maintained for the Target Material family because the family represents the chemical makeup of the Target Material.

Chemical Identifier: This uniquely identifies a chemical substance (such as benzene, toluene or polyester), or a chemical identification of a physical mixture, such as 20% water, 80% methanol.

Material Family, also referred to as "Family": This is a general inventory grouping of Materials used to isolate the chemical nature of the Materials in the group. Families ignore differences in Material identifications stemming from packaging, manufacturing location, etc. For example, "Family A" could represent "acetic acid", grouping 3 materials: "bulk acetic acid", "acetic acid in 55 gallon drums" and "acetic acid in one quart sample jars". Each Family has an associated chemical identifier that indicates the primary chemical substance or mixture associated with it. This chemical identifier generally does not represent a Bill of Material.

Component Class: These are chemical classifications assigned to a Material component in a Manufacturing Bill of Material. The component class is used to filter components that are relevant for deriving a Regulatory Bill of Material from a Manufacturing Bill of Material. The following component classes may be used for derivation rules: BAS (Base); ADD (Additive); REA (Reactant); MON (Monomer); and IMP (Impurity). The following Component Classes may be ignored in the derivation process, but may be used to help clarify the role a given component plays in a specific Bill of Materials: CAT (Catalyst); SOL (Solvent); PAC (Packaging); and IGN (Ignore-special component). Component Classes will be described in detail below in connection with enterprise resource planning 110.

Enterprise Resource Planning 110

Enterprise resource planning according to the present invention will now be described. Enterprise resource planning 110 can include automated product sales order entry 111 that responds to customer orders for a product 112. Manufacturing maintenance component 113 is responsive to a material master file to generate Manufacturing Bills of Materials 115. Blocks 111, 112, 113, 114 and 115 are well known to those having skill in the art and need not be described in detail herein. However, modifications to manufacturing maintenance 113 and Manufacturing Bills of Materials 115 to add component classifications 116 according to the invention, will now be described in detail.

Conventionally, manufacturing maintenance 113 is used to select a Manufacturing Bill of Materials 115 from material master file 114 to provide a recipe for manufacturing a chemical product.

A Component Classification (also referred to as a "Component Class") is assigned to each component of a Manufacturing BOM. Component Classes to be assigned are:

ADD-One of a set of additive components added to a base material in order to form a mixture.

BAS-Base material of a mixture.

CAT-Catalyst component, not considered a part of the final product.

IGN-Material to be ignored.

IMP-Impurity.

MON-Monomer used to form a polymer.

PAC-Packaging material.

REA-A chemical reactant.

SOL-Solvents and other processing aids which do not appear in the final product.

TAR-The Target Material for which a Regulatory BOM is desired

Component Classifications 116 are assigned to Manufacturing BOM 115 components so that the components of the Regulatory BOM 122 can be deduced from knowledge of how the components are used in the manufacturing process. Chemical manufacturing processes generally fall into one of four categories:

Reaction-chemical components are reacted, sometimes in the presence of catalysts and processing aids, to create a new chemical, perhaps with byproducts. Examples: the manufacture of various acids, solvents, esters, etc.

Mixture-Different chemical components are blended to create a mixture, usually with a base chemical with various additives. Examples: compounded plastics, chemical blends, denatured alcohols, acetate fibers.

Polymerization-Monomers are formed into polymers, sometimes with the aid of catalysts and the addition of various additives. Examples: polyethylene, polyester.

Packaging-An already-produced target material, stored in bulk, is packaged into a drum, bag, box, etc.

Generally, the different processes will have certain component classifications in their BOMs that will be used to derive the proper final product components. The components that generally are relevant to the derivation procedures are ADD, BAS, MON and REA, as they are actually used to determine the type of process and components to appear in the final product composition stored in the Regulatory BOM. The general approach for each is as follows:

Reaction-The following component classifications may be found:

CAT-catalyst.

IGN-material to be ignored, such as rework material that may occasionally be fed back into the process. Also, byproducts should be marked IGN.

PAC-packaging, if the packaging step is also included.

REA-the actual reactants.

SOL-processing aids or solvents.

In a reaction, all the reactants disappear as they convert into the final product, and the other components disappear as not relevant. In this case, the chemical composition deriving 121 will assume this is a reaction process and the derived component of the Regulatory BOM 122 will be just the final product itself, i.e., it is "pure" and there are no additional components. No BAS, MON or TAR components should appear. If they appear, they are considered errors.

In some cases, there may be one or more ADD materials on the BOM if the process is truly a mixture of a reactant material (which would be a base material) with additives. In SAP, this may be represented in a single BOM and a routing operation.

Mixture-The following component classifications should be found:

ADD-the additive components of the mixture.

BAS-the base material of the mixture.

IGN-material to be ignored, usually rework material that may be added to the process.

PAC-packaging, if the packaging step is also included.

SOL-processing aids that may be used in mixing the material but which do not appear in the final product. "Solvent" which is a part of the final product should be considered an ADD.

All BAS and ADD material will be considered relevant to the final composition and will be included in the Regulatory BOM. No MON or REA components should appear. If they do, it will be considered an error.

Polymerization-The following component classifications should be found:

ADD-additive components in the polymer.

CAT-catalyst.

IGN-material to be ignored, usually rework material that may be added to the process.

MON-the monomers which are being used to form the polymer.

PAC-packaging, if the packaging step is also included.

SOL-processing aid.

The MON components will be used to access a table from which the corresponding polymer for the given monomers will be derived. Any ADD components will also go into the final product composition BOM, along with the polymer. No BAS, REA or TAR components should appear. If they do, they will be considered an error.

Packaging-Only the following component classifications should be found:

TAR-the produced, bulk materials.

PAC-the packaging components.

The target material is put into the packaging materials. It is assumed that the product components are derived earlier from the BOM of the bulk material. In this case, no final component derivation will take place since this material is in the same family.

Examples of the different classifications will now be provided.

EXAMPLE 1

All Reactants Yield a Single Product, Bulk Liquid Chemical

N-butyl acetate is manufactured from n-butyl alcohol and acetic acid. All materials are reactants and the regulatory component is derived assuming the final product is a non-mixture, single chemical.

The composition of the product, n-butyl acetate, will be derived from the components of the Bill of Materials for its manufacture. This component will be shown as 100% of the final product.

Display Single-Level BOM
Item overview - assembly

| | | | | |
|---|---|---|---|---|
| Material no. P0005600 | | N-BUTYL ACETATE,BU | | |
| BOM number P0005600 | | | | |
| Base qty. 1,000.000 | | KG | | |
| ItNo Component Description | | Qty | Un | Class |

-continued

| | | | |
|---|---|---|---|
| 0010 P0004200 N-BUTYL ALCOHOL,BU | 647.824 | KG | REA |
| 0020 P0985300 ACETIC ACID,BU | 508.925 | KG | REA |

EXAMPLE 2

Reactants With Other Components, Derivation Possible

In the manufacture of the cellulose acetate propionate plastic ester shown below, there are other components that are not carried into the final product composition. In this case, the material still appears as if it is produced from all reactant materials. The only component is then 01861-00, which makes up 100% of the plastic.

Display Single-Level BOM
Item overview - assembly

Material no. P0186100 CAP,BU
BOM number P0186100
Base qty. 1,000.000 KG

| ItNo Component Description | Qty | Un | Class |
|---|---|---|---|
| 0010 P1569100 CELLULOSB,BU | 648.880 | KG | REA |
| 0020 P0469800 SULFURIC ACID,BU | 18.058 | KG | CAT |
| 0030 P1203600 ACETIC ACID,BU | 17.255 | KG | REA |
| 0040 P0027660 PROPIONIC ACID,BU | 1,776.494 | KG | REA |
| 0050 P0015040 PROPIONIC ANHY,BU | 2,123.606 | KG | REA |
| 0060 P0002194 ACETIC ACID,BU | 4,419.320 | KG | REA |
| 0070 P0027693 PROPIONIC ACID, BU | 3,464.704– | KG | IGN |
| 0080 P0002193 ACETIC ACID,BU | 4,376.025– | KG | IGN |
| 0120 P0460501 ADDITIVE I,50LB BG | 0.250 | KG | ADD |
| 0130 P0116701 ADDITIVE II, BG | 0.151 | KG | ADD |

EXAMPLE 3

Reactants with Additives

In the example below, there are additives as part of the BOM for a reaction. The reactants are considered first to determine the desired product, then the additives are added back into the product. In this case the chlorinated polyolefin is the desired product and the stabilizer is the additive.

Display Single-Level BOM
Item overview - assembly

Material no. P0238100 CHLORINATED POLYOLEFIN IN XYLENE
BOM number P0238100
Base qty. 5,568.000 KG -continued

| ItNo Component no. Description | Qty | Un | Class |
|---|---|---|---|
| 0010 P0000700 CHLORINE,BU | 1,043.487 | KG | REA |
| 0020 P0004000 ACETONE,BU | 3,674.098 | KG | SOL |
| 0030 P0040200 XYLENE,MIXED,BU | 6,038.370 | L | SOL |
| 0040 P0068402 STABILIZER,DR | 1,213.359 | KG | SOL |
| 0060 P0326610 MODIFIED POLYOLEFIN,50LB BG | 1,088.622 | KG | REA |

EXAMPLE 4

Chemical Mixture Alcohol Blend

SDA 1 is created by denaturing pure ethanol with methanol and methyl isobutyl ketone (MIBK). The ethanol is shown as the base material, while the denaturants are shown as additives. The system will derive a composition BOM for the Family that has components 01786-00, 00012-00, and 02039-00 in their corresponding proportions.

Display Single-Level BOM
Item overview - assembly

Material no. P1281900 SDA 1,ANH,BU
BOM number P1281900
Base qty. 393.682 L

| ItNo Component Description | Qty | Un | Class |
|---|---|---|---|
| 0010 P0178600 ETHYL ALCOHOL,200 PROOF,BU | 379.014 | L | BAS |
| 0020 P0001200 METHANOL,BU | 15.142 | L | ADD |
| 0030 P0203900 MIBK,BU | 3.046 | KG | ADD |

EXAMPLE 5

Plastic Mixture

This example illustrates the manufacture of a plastic mixture.

Display Single-Level BOM
Item overview - assembly

Material no. 50000104 264A37200MS CLEAR TP,25KG BG
BOM number 50000104
Base qty. 1,191.000 KG

| ItNo Component Description | Qty | Un | Class |
|---|---|---|---|
| 0010 CAB 264 | 1,000.000 | KG | BAS |
| 0020 TC000204 B-51 SOL BLUE LIQ. | 5.000 | KG | ADD |
| 0030 TS000010 15304 STABILIZER | 10.000 | KG | ADD |
| 0040 P0041300 DOA,BU | 176.000 | KG | ADD |
| 0050 TZBG001 CELLULOSICS BAGS, 25 KG | 47.640 | EA | PAC |

EXAMPLE 6

Polyester Increased in Molecular Weight in the Solid State

Building up the molecular weight of a polyester polymer in the solid state is a special case because the final operation adds no components. The regulatory BOM is based on the composition of the precursor. Thus for each of these "built-up" polyesters, the family of the polyester is referenced to the family of the precursor polymer, using the composition family field. In the BOM below, polyester P15418FZ (family 62500217) is treated to increase its molecular weight to become polyester P15419FZ (family 62500218). But 62500218 is referenced to 62500217 so the composition determination doesn't have to be redone.

Display Single-Level BOM
Item overview - assembly

Material no. P15419FZ — PET 9921W,C1,C,BU
BOM number P15419FZ
Base qty. 1,000.000 — KG

| ItNo Component Description | Qty | Un | Class |
|---|---|---|---|
| 0010 P15418FZ PET 12087,BU | 1,005.060 | KG | TAR |

Display material—centrally
Object:
62500218
Cross Section . . .
Turns Per Inch . . .
Dope Number . . .
Dope Color . . .
Fiber Grade . . .
Chemical Reactivity Class . . . 13
Sales Restricted Flag . . .
Quality Classification . . . 1
Commercialized . . .
Commercialization Date . . .
Composition Family . . . 62500217

The classifications of the components of the precursor are shown. Using the monomers, a table will be searched to determine the final PM composition of the monomer set.

Display Single-Level BOM
Item overview - assembly

Material no. P15418FZ — PET 12087,C1,C,BU
BOM number P15418FZ
Base qty. 1,000.000 — KG

| ItNo Component no. Description | Qty | Un | Class |
|---|---|---|---|
| 0030 P06792NZ CHDM,C1,K,BU | 13.040 | KG L V | MON |
| 0040 P0138200 ETHYLENE GLYCOL,BU | 350.100 | KG L V | MON |
| 0050 P0011500 DIETHYLENE GLYCOL,BU | 2.220 | KG L V | MON |
| 0070 P1506303 CATALYST,WET,BX | 0.320 | KG L V | CAT |
| 0130 P14978S3 MONOMER I,DR | X.XX | % K L V | MON |
| 0140 P14943S2 MONOMER II,DR | X.XX | % K L V | MON |
| 0150 P1549700 CATALYST CONCENTRATE,BU | 1.034 | KG L V | CAT |
| 0160 P07327FZ MIXED GLYCOL & MONOMER, C,BULK | 2.000– | KG L V | IGN |
| 0170 P10597NZ PTA,CED,BULK | 852.800 | KG L V | M MON |

EXAMPLE 7

Polyolefin

Display Single-Level BOM
Item overview - assembly

Material no. 50001346 — POLYETHYLENE, BU
BOM number 50001346
Base qty. 1,000.000 — KG

| ItNo Component no. Description | Qty | Un | Class |
|---|---|---|---|
| 0010 P0228707 CATALYST I,CT | 0.375 | KG | CAT |
| 0020 P0205207 CATALYST II,CT | 0.047 | KG | CAT |
| 0030 P0207900 MINERAL SPIRITS,BU | 3.633 | KG | SOL |
| 0040 P02004C0 ETHYLENE,B-30,BU | 1,000.000 | KG | MON |

EXAMPLE 8

Amorphous polyolefin

Display Single-Level BOM
Item overview - assembly

Material no. P0272203 — POLYOLEFIN,MOLTEN,BU
BOM number P0272203
Base qty. 20,000.000 — KG

| ItNo Component no. Description | Qty | Un | Class |
|---|---|---|---|
| 0010 P02006B0 PROPYLENE,BU | 17,376.090 | KG | MON |
| 0020 P02004H0 ETHYLENE,BU | 2,600.000 | KG | MON |
| 0030 P02208P2 STABILIZER,DR | 21.000 | KG | ADD |
| 0040 P0267702 CATALYST I,DR | 2.860 | KG | CAT |
| 0050 P1533505 CATALYST II,ANHY,CL | 1.060 | KG | CAT |

Returning again to FIG. 1, a production engineer utilizes manufacturing maintenance 113 to create Manufacturing Bills of Material 115 including Component Classifications 116. The production engineer will have cognizance of the end product and the type of classifications that are to be added.

It will be understood by those having skill in the art that Component Classifications 116 for a Manufacturing Bill of Materials 115 may be added using manufacturing maintenance 113 in background processing in response to anticipated production of a new Manufacturing Bill of Materials. Alternatively, Component Classifications 116 may be added in foreground processing in response to a receipt of a customer order for a product 112 by automated product sales order entry 111.

Composition Ascertaining 120

Composition ascertaining derives the Regulatory Bill of Materials 122. Chemical composition deriving 121 derives from the Bill of Materials the chemical compositions present in the manufactured chemical product, to thereby produce chemical compositions 122, also referred to as Regulatory Bills of Materials. Manual adjusting 123 may be used to adjust the Regulatory Bills of Materials for impurities.

Figure 2:
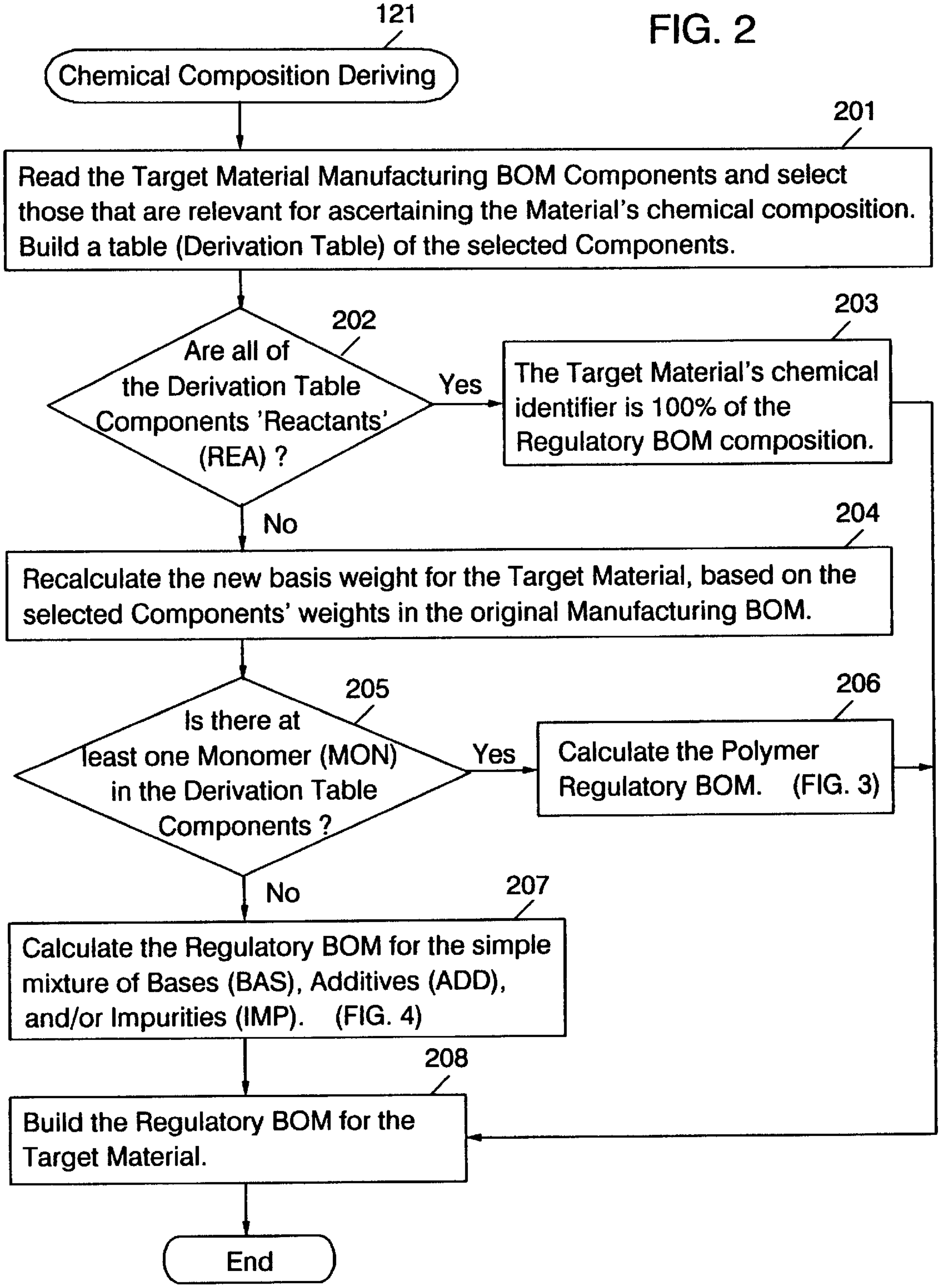
FIG. 2 illustrates chemical composition deriving of FIG. 1.

Referring now to FIG. 2, chemical composition deriving (Block 121 of FIG. 1) will now be described in detail. As shown at Block 201, the Target Material Manufacturing Bill of Materials 115 is read and those components that are relevant for ascertaining the Material's chemical composition are selected. A temporary table, referred to as a Derivation Table, of the selected components is then built. A test is then made, at Block 202, as to whether all the derivation table components are reactants (Class REA). If YES, then at Block 203 the Target Material's chemical identifier is 100% of the regulatory BOM composition and the regulatory BOM is built for the Target Material at Block 208. No further calculations need to be done.

On the other hand, if not all the Derivation Table components are reactants at Block 202, the new basis weight for the Target Material is recalculated, based on the selected component's weight in the original Manufacturing Bill of Materials, at Block 204. A test is then made at Block 205 as to whether there is at least one monomer (Class MON) in the derivation table components. If YES, the polymer regulatory BOM is calculated at Block 206. Details of calculating the polymer regulatory BOM will be provided in connection with FIG. 3.

Returning to Block 205, if there is not at least one monomer in the derivation table components, then the regulatory BOM relates to a mixture. Accordingly, at Block 207, the regulatory BOM is calculated for the simple mixture of bases, additives and/or impurities. The calculation for the mixture regulatory BOM 122 for the Target Material is then built at Block 208.

Figure 3:
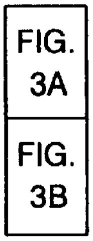
FIGS. 3A and 3B, which together form FIG. 3 as indicated, indicate calculating a polymer regulatory bill of material of FIG. 2.
Figure 3A:
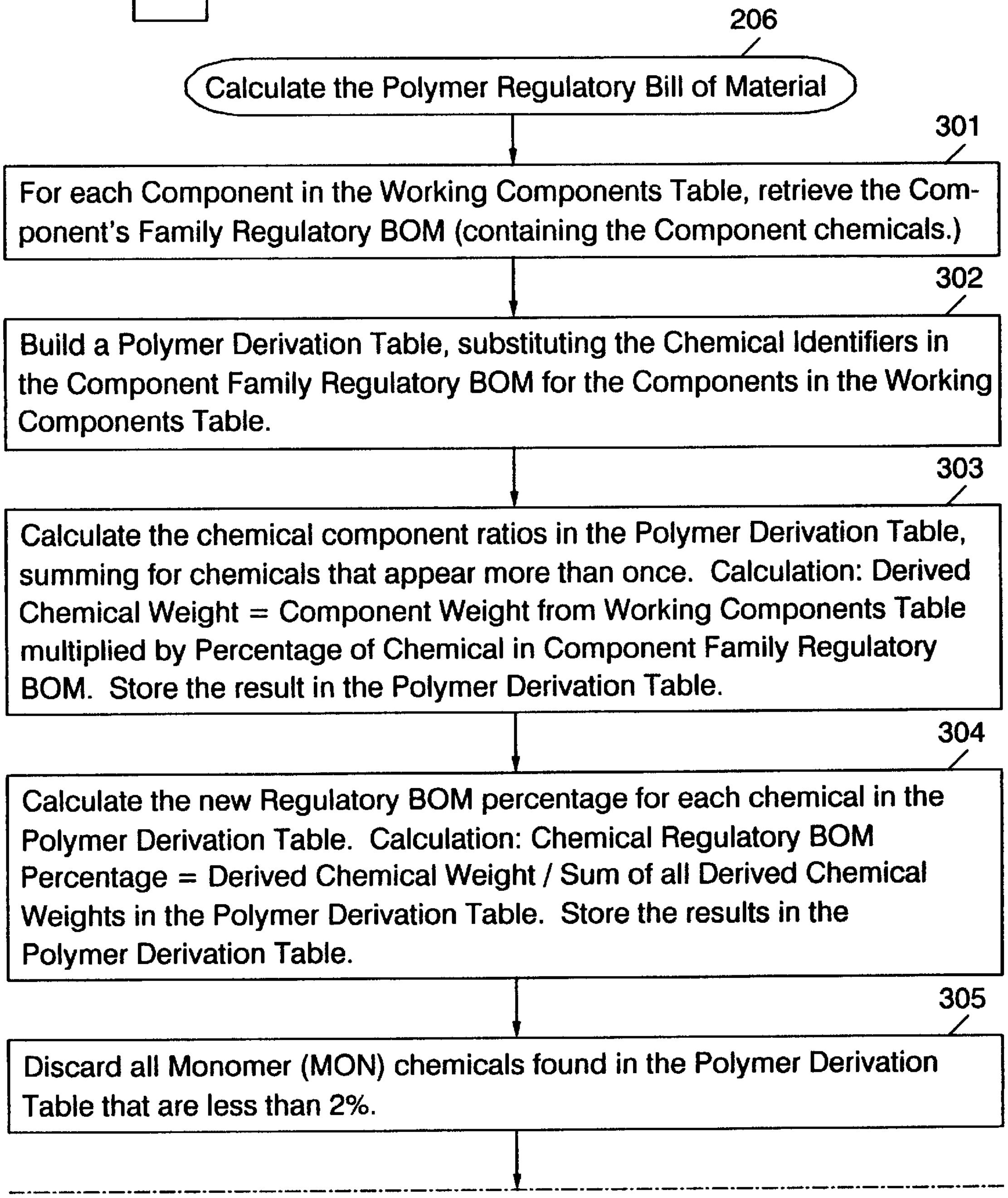
Figure 3B:
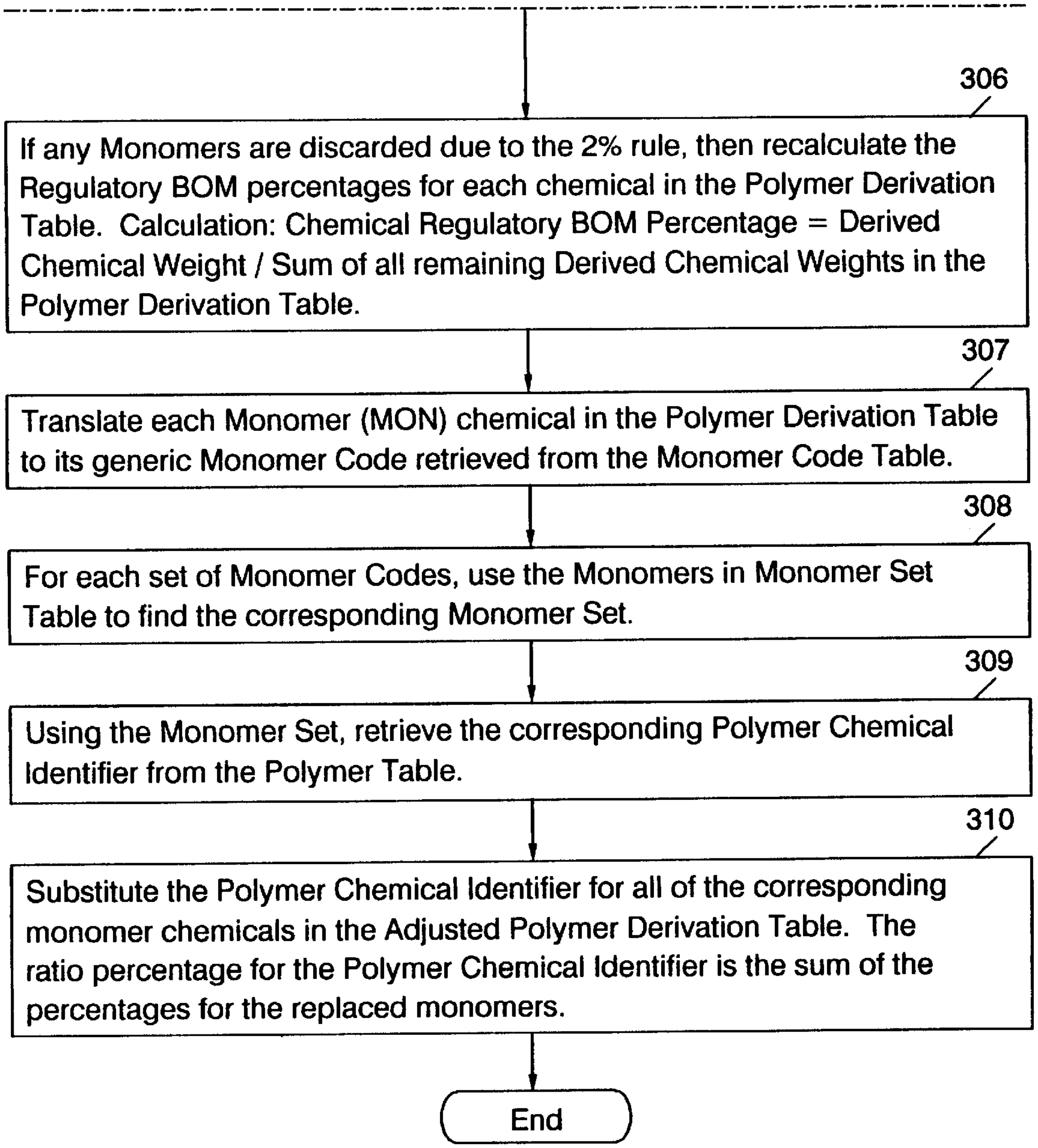

Referring now to FIG. 3, operations for calculating the polymer regulatory bill of materials (Block 206 of FIG. 2) will now be described. FIGS. 3A and 3B together form FIG. 3 as indicated. As shown at Block 301, for each component in the Derivation Table, the components classified as MONomers are retrieved. Then at Block 302 a temporary Polymer Derivation Table is built, substituting the monomer codes for each monomer. At Block 303, the chemical component ratios are calculated, summing any monomers which appear more than once in the Manufacturing BOM. This result is stored in the Polymer Derivation Table.

At Block 304, a new regulatory BOM percentage is calculated for each chemical in the Polymer Derivation Table. Then, referring to Block 305, an optional operation may discard all monomer chemicals found in the Polymer Derivation Table that are less than 2% by weight. This operation is performed because many regulations do not require new regulatory compliance for polymers that contain less than 2% of an additional monomer. If this "2% Rule" is being used, then at Block 306 the regulatory BOM percentages are recalculated using the calculations shown in Block 306.

At Block 307, each monomer chemical in the Polymer Derivation Table is then translated into its generic monomer code that is retrieved from the Monomer Code Table.

At Block 308, for the set of monomer codes derived from the above step, the monomers in the Monomer Set Table are used to find the corresponding monomer set, i.e., the set that contains all of the monomers in the Polymer Derivation Table and no additional monomers. At Block 309, using the monomer set found at Block 308, the corresponding polymer chemical identifier for all the corresponding monomer chemicals is substituted in the adjusted Polymer Derivation Table.

Figure 4:
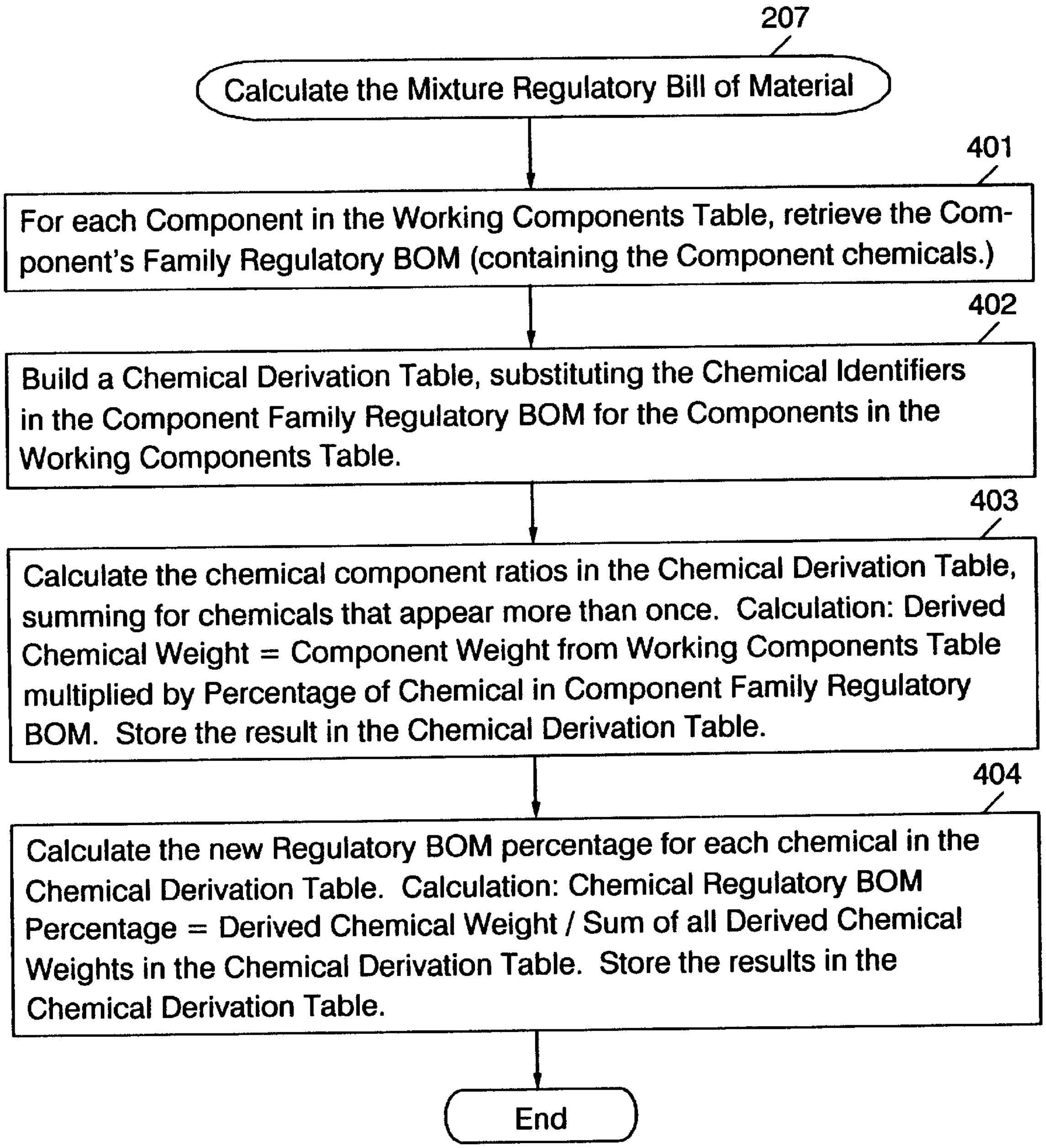
FIG. 4 illustrates calculating a mixture regulatory bill of material of FIG. 2.

Referring now to FIG. 4, calculation of Regulatory Bills of Materials for mixtures (207 of FIG. 2) will now be described. As shown in Block 401, for each component in the Manufacturing BOM, the chemical identifier is retrieved. At Block 402 a temporary Chemical Derivation Table is built, substituting the chemical identifiers in the component family regulatory BOM for the components in the Manufacturing BOM. Then at Block 403 the chemical component ratios in the Chemical Derivation Table are calculated, summing for the chemicals that appear more than once. The calculation is shown in Block 403, and the result is stored in the Chemical Derivation Table. Finally, at Block 404, the new regulatory BOM percentage is calculated for each chemical in the Chemical Derivation Table. The calculation is shown at Block 404. These results are stored in the Chemical Derivation Table.

Examples of Chemical Composition Deriving

Although detailed flowcharts were provided for chemical composition deriving for FIGS. 2, 3 and 4, specific examples will now be provided. It will be understood that these examples are illustrative and are not to be viewed as limiting. Three examples will be given: calculating a Regulatory Bill of Material when all the working components table components are reactants (Block 203 of FIG. 2); calculating a Regulatory Bill of Materials for a simple mixture (FIG. 4); and calculating a polymer Regulatory Bill of Materials (FIG. 3).

EXAMPLE 9

Calculating a Regulatory Bill of Material 122 when all of the Working Components Table components are Reactants (Block 203):

Given:

Mfg. BOM for product Material P2345678 (Target Material), Family 71000600, 1000 kg basis:

| Component Material | Class | Qty. | Family |
|---|---|---|---|
| 50000006 | REA | 400 kg | 71000111 |
| 50000007 | REA | 300 | 71000222 |
| 50000008 | CAT | 200 | 71000333 |
| 50000009 | CAT | 100 | 71000444 |
| | | 1000 kg | |

Chemical Composition Deriving:

1. Read the Target Material Mfg. BOM Components and select those that are relevant for ascertaining the Material's chemical composition (Block 201).

The Catalysts (50000008 and 50000009) are ignored, building the following Working Components Table of the selected Components:

Working Components Table

| Component Material | Class | Qty. | Family |
|---|---|---|---|
| 50000006 | REA | 400 kg | 71000111 |
| 50000007 | REA | 300 | 71000222 |
| | | 700 kg | |

2. Are all of the Working Components Table components 'Reactants' (Block 202)? Yes.
3. The Target Material's chemical identifier is 100% of the Regulatory Bill of Material composition (Block 203).

Family Table

| Family | Chemical Id |
|---|---|
| . . . | |
| 71000600 | 11000-00 |
| . . . | |

Target Material P2345678 is a member of Family 71000600, which is 100% of Chemical Id. 11000-00.

4. Build the Regulatory Bill of Material for the Target Material (Block 208). Family Regulatory Bills of Material:

| Family | Chemical Id. | % Weight |
|---|---|---|
| 71000600 | 11000-00 | 100% |

EXAMPLE 10

Calculating the Regulatory Bill of Material for a simple mixture (Block 207):

Given:

Mfg. BOM for product Material P3456789 (Target Material), Family 71000700, 1000 kg basis:

| Component Material | Class | Qty. | Family |
|---|---|---|---|
| 50000011 | BAS | 500 kg | 71001000 |
| 50000012 | ADD | 300 | 71002000 |
| 50000013 | ADD | 200 | 71003000 |
| | | 1000 kg | |

Family Regulatory Bills of Material:

| Family | Chemical Id | % Weight |
|---|---|---|
| 71000600 | 11000-00 | 100% |
| 71001000 | 00010-00 | 100% |
| 71002000 | 00020-00 | 100% |
| 71003000 | 00030-00 | 30% |
| 71003000 | 00040-00 | 70% |

Chemical Composition Deriving:

1. Read the Target Material Mfg. BOM Components and select those that are relevant for ascertaining the Material's chemical composition (Block 201).

All Components are kept, building the following Working Components Table of the selected Components:

Working Components Table

| Component Material | Class | Qty. | Family |
|---|---|---|---|
| 50000011 | BAS | 500 kg | 71001000 |
| 50000012 | ADD | 300 | 71002000 |
| 50000013 | ADD | 200 | 71003000 |
| | | 1000 kg | |

2. Are all of the Working Components Table components 'Reactants' (Block 202). No.
3. Recalculate the new basis weight for the Target Material, based on the selected Components' weights in the original Mfg. BOM (Block 204). The sum of the remaining Components is 1000 kg.
4. Is there at least one Monomer in the Working Components Table (Block 205). No.
5. Calculate the Regulatory Bill of Material for the simple mixture of Bases (BAS), Additives (ADD) and/or Impurities (IMP) (Block 207).

For each Component in the Working Components Table, retrieve the Component's Family Regulatory Bill of Materials (Block 401).

Family Regulatory Bills of Material:

| Family | Chemical Id | % Weight |
|---|---|---|
| 71001000 | 00010-00 | 100% |
| 71002000 | 00020-00 | 100% |
| 71003000 | 00030-00 | 30% |
| 71003000 | 00040-00 | 70% |

6. Build a Chemical Derivation Table, substituting the Chemical Identifiers in the Component Family Regulatory BOM for the Components in the Working Components Table (Block 402).

Derived Chemical Weight=(Component Weight from Working Components Table)×(% of Chemical in Component Family Regulatory BOM).

(Calculation matrix:)

| Component | Component Weight | Chemical Id. | Family Chem % | Derived Weight |
|---|---|---|---|---|
| 50000011 | 500 kg | 00010-00 | 100% | 500 kg |
| 50000012 | 300 kg | 00020-00 | 100% | 300 kg |
| 50000013 | 200 kg | 00030-00 | 30% | 60 kg |
| 50000013 | 200 kg | 00040-00 | 70% | 140 kg |
| | | | | 1000 kg |

Chemical Derivation Table

| Chemical Id | Weight |
|---|---|
| 00010-00 | 500 kg |
| 00020-00 | 300 |

-continued

| Chemical Derivation Table | |
|---|---|
| Chemical Id | Weight |
| 00030-00 | 60 |
| 00040-00 | 140 |
| | 1000 kg |

7. Calculate the new Regulatory BOM percentage for each chemical in the Chemical Derivation Table (Block 404). Calculation:

Chemical Regulatory BOM Percentage=(Derived Chemical Weight)/(Sum of all Derived Chemical Weights in the Chemical Derivation Table).

Chemical Derivation Table

| Chemical Id | Weight | Percentage |
|---|---|---|
| 00010-00 | 500 kg | 50% |
| 00020-00 | 300 | 30% |
| 00030-00 | 60 | 6% |
| 00040-00 | 140 | 14% |
| | 1000 kg | 100% |

(Sum the calculated weights for Chemicals that appear more than once. None in this example.)

8. Build the Regulatory Bill of Material for the Target Material (Block 208).

Family Regulatory Bills of Material:

| Family | Chemical Id. | % Weight |
|---|---|---|
| 71000700 | 00010-00 | 50% |
| 71000700 | 00020-00 | 30% |
| 71000700 | 00030-00 | 6% |
| 71000700 | 00040-00 | 14% |
| 71001000 | 00010-00 | 100% |
| 71002000 | 00020-00 | 100% |
| 71003000 | 00030-00 | 30% |
| 71003000 | 00040-00 | 70% |
| . . . | | |

EXAMPLE 11

Calculating the Polymer Regulatory Bill of Materials (Block 206):

Given:

Mfg. BOM for product Material P1234567 (Target Material), Family 71000500, 1000 kg basis:

| Component Material | Class | Qty. | Family |
|---|---|---|---|
| 50000001 | MON | 300 kg | 71000100 |
| 50000002 | MON | 300 | 71000200 |
| 50000003 | CAT | 100 | 71000999 |
| 50000004 | ADD | 150 | 71000300 |
| 50000005 | ADD | 150 | 71000400 |
| | | 1000 kg | |

Family Regulatory Bills of Material:

| Family | Chemical Id. | % Weight |
|---|---|---|
| 71000100 | 10000-00 | 100% |
| 71000200 | 20000-00 | 100% |
| 71000300 | 30000-00 | 30% |
| 71000300 | 35000-00 | 70% |
| 71000400 | 40000-00 | 40% |
| 71000400 | 45000-00 | 60% |

Chemical Composition Deriving:

1. Read the Target Material Mfg. BOM Components and select those that are relevant for ascertaining the Material's chemical composition (Block 201).

The Catalyst (50000003) is ignored, building the following Working Components Table of the selected Components:

Working Components Table

| Component Material | Class | Qty. | Family |
|---|---|---|---|
| 50000001 | MON | 300 kg | 71000100 |
| 50000002 | MON | 300 | 71000200 |
| 50000004 | ADD | 150 | 71000300 |
| 50000005 | ADD | 150 | 71000400 |
| | | 900 kg | |

2. Are all of the Working Components Table components 'Reactants' (Block 202)? No.
3. Recalculate the new basis weight for the Target Material, based on the selected Components' weights in the original Mfg. BOM (Block 204).

The sum of the remaining Components is 900 kg.
4. Is there at least one Monomer in the Working Components Table (Block 205). Yes, there are 2: 50000001 and 50000002.
5. For each Component in the Working Components Table, retrieve the Component's Family Regulatory BOM (containing the Component chemicals) (Block 301).

Family Regulatory Bills of Material:

| Family | Chemical Id. | % Weight |
|---|---|---|
| 71000100 | 10000-00 | 100% |
| 71000200 | 20000-00 | 100% |
| 71000300 | 30000-00 | 30% |
| 71000300 | 35000-00 | 70% |
| 71000400 | 40000-00 | 40% |
| 71000400 | 45000-00 | 60% |

6. Build a Polymer Derivation Table, substituting the Chemical Identifiers in the Component Family Regulatory BOM for the Components in the Working Components Table (Block 302).

Polymer Derivation Table

| Chemical Id | Calculated Weight | Class |
|---|---|---|
| 10000-00 | | MON |
| 20000-00 | | MON |
| 30000-00 | | ADD |

-continued

Polymer Derivation Table

| Chemical Id | Calculated Weight | Class |
|---|---|---|
| 35000-00 | | ADD |
| 40000-00 | | ADD |
| 45000-00 | | ADD |

7. Calculate the chemical component ratios in the Working Components Table, summing for chemicals that appear more than once (Block 303). Calculation:

Derived Chemical Weight=(Component Weight from Polymers Derivation Table)×(% of Chemical in Component Family Regulatory BOM).

(Calculation matrix:)

| Component | Component Weight | Chemical Id. | Family Chem % | Derived Weight |
|---|---|---|---|---|
| 50000001 | 300 kg | 10000-00 | 100% | 300 kg |
| 50000002 | 300 kg | 20000-00 | 100% | 300 kg |
| 50000004 | 150 kg | 30000-00 | 30% | 45 kg |
| 50000004 | 150 kg | 35000-00 | 70% | 105 kg |
| 50000005 | 150 kg | 40000-00 | 40% | 60 kg |
| 50000005 | 150 kg | 45000-00 | 60% | 90 kg |
| | | | | 900 kg |

Store the result in the Polymer Derivation Table.

(See combined results in Step 7.)

8. Calculate the new Regulatory BOM percentage for each chemical in the Polymer Derivation Table (Block 304). Calculation:

Chemical Regulatory BOM Percentage=Derived Chemical Weight/Sum of all Derived Chemical Weights in the Polymer Derivation Table.

Polymer Derivation Table

| Chemical Id | Weight | Percentage | Class |
|---|---|---|---|
| 10000-00 | 300 kg | 33% | MON |
| 20000-00 | 300 | 33% | MON |
| 30000-00 | 45 | 5% | ADD |
| 35000-00 | 105 | 12% | ADD |
| 40000-00 | 60 | 7% | ADD |
| 45000-00 | 90 | 10% | ADD |
| | 900 | 100% | |

(Sum the calculated weights for Chemicals that appear more than once. None in this example.)

9. Discard all Monomer (MON) chemicals found in the Polymer Derivation Table that are less than 2% (Block 305).

(None in this example.)

10. If any Monomers are discarded due to the 2% rule, then recalculate the Regulatory BOM percentages for each chemical in the Polymer Derivation Table (Block 306). Calculation:

Chemical Regulatory BOM Percentage=Derived Chemical Weight/Sum of all remaining Derived Chemical Weights in the Adjusted Polymer Derivation Table.

(Not in this example.)

11. Translate each Monomer (MON) chemical in the Polymer Derivation Table to its generic Monomer Code retrieved from the Monomer Code Table (Block 307).

Monomer Chemicals Table (Multiple Chemicals can represent the same monomer.)

Monomer

| Chemical | Monomer |
|---|---|
| 00030-00 | DMT |
| 10000-00 | EG |
| 20000-00 | CHDM |
| 93992-00 | DMT |
| . . . | . . . |

Monomer Code Table

| Monomer | Monomer Name |
|---|---|
| CHDM | Cyclohexanedimethanol |
| DMT | Dimethyleneterephthalate |
| EG | Ethylene Glycol |
| . . . | . . . |

12. For the set of Monomer Codes derived in the above step, use the Monomers in Monomer Set Table to find the corresponding Monomer Set (Block 308) that contains all of the monomer codes but only those monomer codes.

| Monomers in Monomer Set Table | | Polymer Table | |
|---|---|---|---|
| Monomer | Monomer Set | Monomer Set | Polymer Chemical Id. |
| EG | 1 | 1 | 50000-00 |
| CHDM | 1 | 2 | 60000-00 |
| DMT | 1 | | |
| EG | 2 | | |
| CHDM | 2 | | |

13. Using the Monomer Set identifier, retrieve the corresponding Polymer Chemical Identifier from the Polymer Table (Block 309).

(See retrieval of Polymer Chemical Id. 50000-00 above.)

14. Substitute the Polymer Chemical Identifier for all of the corresponding monomer chemicals in the Polymer Derivation Table. The ratio percentage for the Polymer Chemical identifier will be the sum of the percentages for the replaced monomers (Block 310).

Polymer Derivation Table

| Chemical Id | Weight | Percentage | Class |
|---|---|---|---|
| 50000-00 | 600 kg | 66% | |
| 30000-00 | 45 | 5% | ADD |
| 35000-00 | 105 | 12% | ADD |
| 40000-00 | 60 | 7% | ADD |
| 45000-00 | 90 | 10% | ADD |
| | 900 | 100% | |

15. Build the Regulatory Bill of Material for the Target Material (Block 208). (The Target Material's Family is 71000500, adding the following entries:)

Family Regulatory Bills of Material:

| Family | Chemical Id. | % Weight |
|---|---|---|
| 71000500 | 30000-00 | 5% |
| 71000500 | 35000-00 | 12% |
| 71000500 | 40000-00 | 7% |
| 71000500 | 45000-00 | 10% |
| 71000500 | 50000-00 | 66% |

Referring again to FIG. 1, it will be understood that manual adjusting 123 may be performed on the regulatory bills of material 122 that were calculated in FIGS. 2–4 in order to add impurities that are present in the chemical compositions 122.

Compliance Comparing 130: Overview

In response to the automated product sales order entry 111, and the Regulatory Bills of Materials 122 corresponding to the automated product sales order entry 111, regulatory compliance verifying 133 compares the chemical compositions 122 to a stored set of government regulatory standards that are contained in regulatory databases 131 and maintained by regulatory database maintenance 132 in order to determine compliance. Prior to describing the details of compliance comparing 130, background on regulatory compliance and overall rules for compliance will be described.

The U.S. chemical industry is regulated by many laws including but not limited to TSCA, RCRA, SARA, CDTA, FIFRA, FFDCA. Other countries have many similar laws that control the chemicals that may be used for commercial use within their boundaries. An overview of these laws will now be provided.

Toxic Substances Control Act (TSCA)

TSCA is a complex set of laws that defines all chemicals (which include polymers) as being either "exixting" or "new". Existing chemicals are those which are on a list called the TSCA inventory. Existing chemicals were placed on the inventory either by grandfathering when TSCA was enacted or by premanufacture notification since that time. Existing chemicals may be used (with some exceptions) for any commercial application. New chemicals, on the other hand, generally must be reviewed by the Environmental Protection Agency (EPA) and approved prior to use for commercial applications. The review process is called Pre-Manufacture Notification (PMN).

Thus, a first aspect of regulatory compliance verifying 133 is to ensure that all of the chemicals (or all of the components in mixtures) used, manufactured or sold in the U.S. are on the TSCA inventory. This can be accomplished by determining the composition of the products and checking them against a computerized list of chemicals on the TSCA inventory in the regulatory database 131.

There are several exemptions to listing all chemicals on the TSCA inventory. One exemption is the TSCA Research and Development exemption. This states that a company need not make a premanufacture notification for any chemicals that are used solely for research and development purposes. However, there are restrictions on how these chemicals must be handled and managed. Briefly, research and development chemicals may be used, sampled and even evaluated as long as they are not placed into commerce. Thus, orders for these chemicals, which are not on the TSCA inventory, must be checked to ensure that only certain customers can order them. The links between approved customers and the R&D products can be made in regulatory compliance verifying 133 and orders entered by nonapproved customers may be blocked.

Another aspect of TSCA is that a manufacturer must notify the EPA each time it samples or sells any of certain listed chemicals into another country for the first time. Keeping up with dozens of such chemicals and over a hundred countries may be difficult. Making this requirement more difficult is that the rule does not have a minimum limit for impurities or additives. Thus, it may be important to know the exact composition of each and every product so that proper notifications can be made.

Another aspect of TSCA is that EPA can request data on chemicals that contain or are made with certain chemicals at its will. A manufacturer may need to identify any products that contain those chemicals in order to determine its reporting liabilities. This aspect may not result in an order block, but may rely on the compositional data to determine what reports must be made.

Similar laws have been enacted in Canada, the European Union, Australia, Japan, China, South Korea and the Philippines. The Regulatory Compliance Verifying 133 interacts with all of these nations by checking both the ship-from country and the ship-to country and against the inventories of each country. Generally, all of these inventories may be different.

Federal Insecticide Fungicide and Rodenticide Act (FIFRA)

Pesticides are regulated by FIFRA and not by the general TSCA law. Thus, the Regulatory Compliance Verifying 133 identifies any materials or products that are pesticides and checks their compliance with pesticide laws in the world. The sale of pesticides may be restricted to specific customers by linking the material identity to the customer location number and other customers would be blocked if they attempt to order a restricted chemical.

Chemical Diversion and Trafficking Act (CDTA)

The Drug Enforcement Administration (DEA) administers the CDCA. This regulation requires a manufacturer to maintain certain records, to establish a list of approved customers for certain chemicals, to notify DEA immediately of any new potential customers and to hold their orders for 15 days while the DEA investigates them, and to notify and hold all export orders for those certain chemicals. The regulatory compliance verifying block 133 can ensure that all customers for these chemicals are approved prior to shipment.

Chemical Warfare Convention (CWC)

This new treaty will require manufacturers to manage certain chemicals in a special way that will help ensure that these precursors to chemical weapons are not stolen or ordered by certain countries. Although the implementing regulations have not been promulgated yet, the regulatory compliance verifying block may include the ability to limit the sales of CWC chemical.

Customer-Specific Chemicals

The regulatory compliance verifying block may also be able to limit the sale of any chemical to one or more specific customers. This may be used when toll manufacturing a chemical for a customer or if the chemical is subject to a secrecy agreement.

Figure 5A:
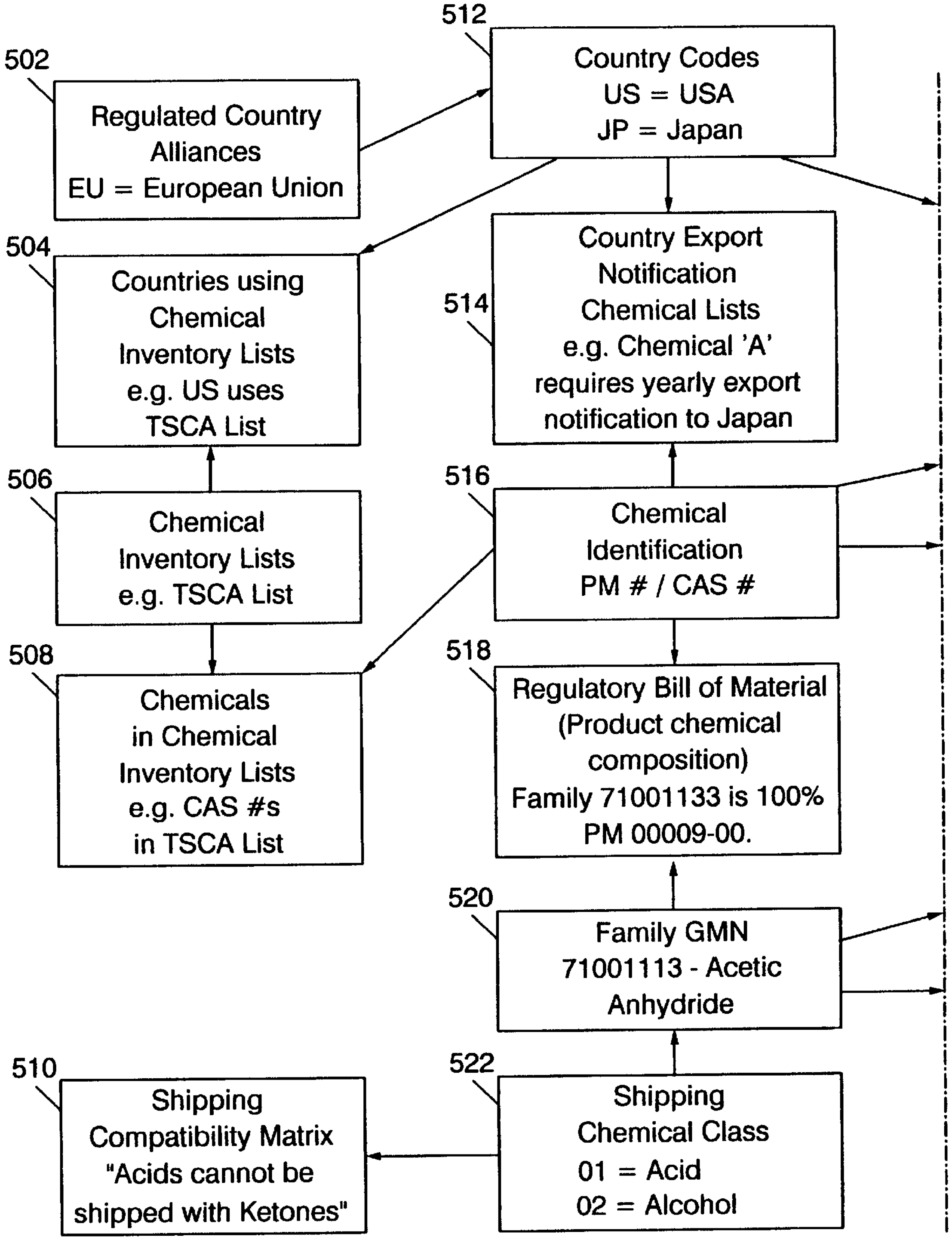
FIGS. 5A and 5B which together form FIG. 5 as indicated, illustrate regulatory databases of FIG. 1.
Figures 5, 5B:
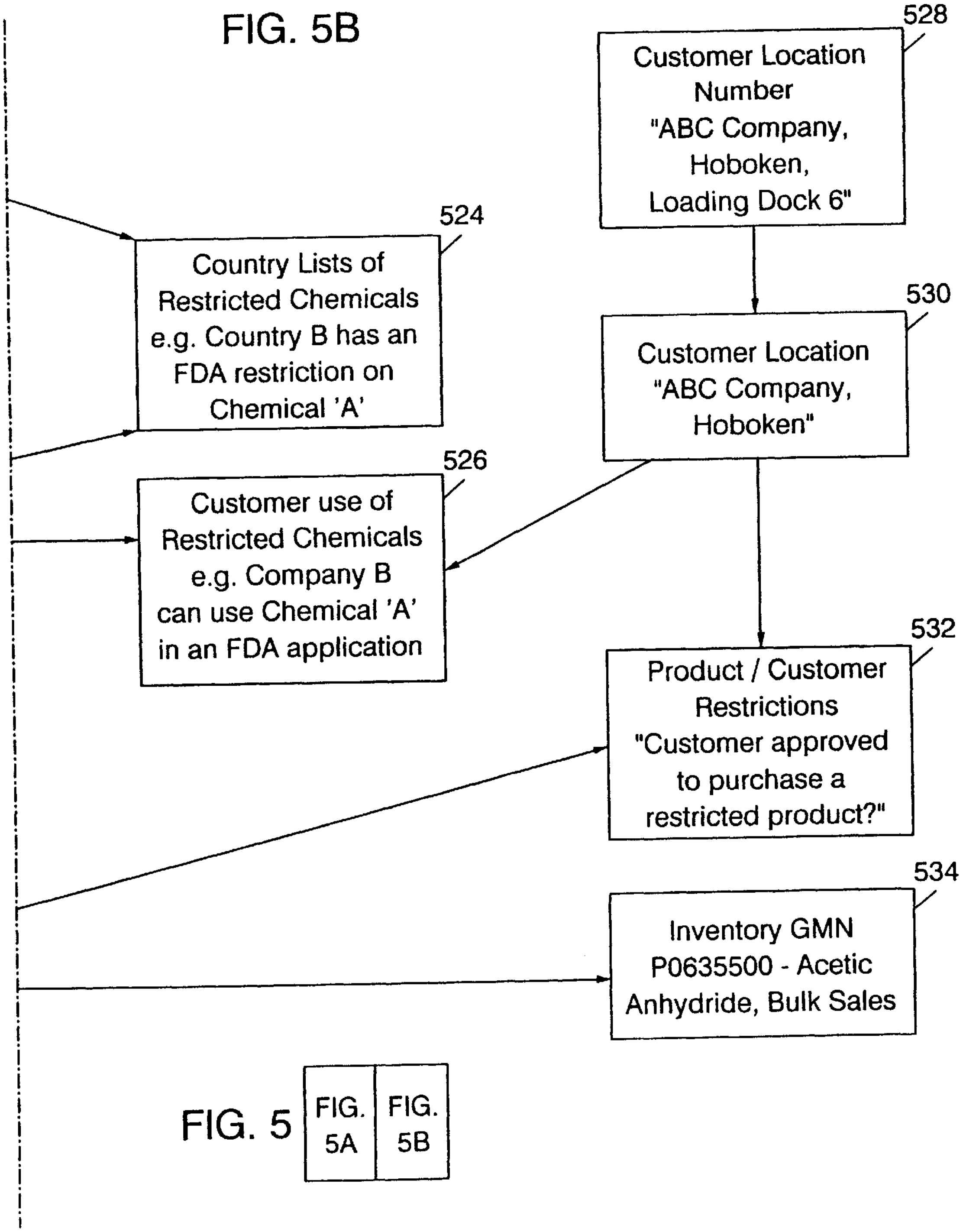

The regulatory databases 131 include listings of chemicals that are regulated by these various regulations. These databases may be provided by outside suppliers or may be generated internally by studying the regulations. An example of the regulatory databases is shown in FIG. 5A and FIG. 5B which together form FIG. 5 as indicated. Since the present invention is independent of the details in the regulatory databases 131, a detailed description of each database need not be provided. A detailed description of a regulatory database, such as a TSCA database, may be found in National Inventories, as available from Chemical Abstracts Service, the disclosure of which is hereby incorporated herein by reference.

An overview of the business rules for regulatory compliance verifying 133 will now be provided. These rules are embodied in the regulatory databases 131 (FIG. 5) and are maintained and updated by regulatory database maintenance Block 132 of FIG. 1:

1. Customer locations. The SAP ship-to customer location codes 528 may be too detailed for use in the regulatory world. A generic "city location" customer number 530 may be used.
2. Regulated countries 520, 504, 512. This list includes countries that have enacted regulations governing the import of chemicals across their borders. If a ship-from or ship-to country is not regulated, then no regulatory checks are required for that country. The rules check both the ship-from and the ship-to countries on the order.
3. Chemical Inventory Lists 506, 508, 516, 518. Most heavily industrialized countries have their own published lists of chemicals that are legal for import. If a product is to be imported into one of those countries, then the product's chemical components must all be on that country's approved list of chemicals. In the U.S., the approved list of chemicals is covered under the "Toxic Substances Control Act" (TSCA).
4. Restricted Chemical Lists 524. There are chemical restrictions specific to countries that define rules outside of the Chemical Inventory Lists. Some of these rules prevent shipment to countries/customers; others allow shipment under specific conditions:
   a. If a chemical is FDA-restricted, then customers must be approved to buy the chemical.
   b. If a chemical is DEA-restricted, then customers must be approved to buy the chemical.
   c. If a chemical is an ozone-depleting agent, shipment may be disallowed.
   d. If a chemical is a chemical-warfare agent, disallow shipment.
   e. If a chemical is flagged for research and development use only in a region, then a check is made to see if an annual or cumulative volume limit applies. If so, then the calculated order volume of the chemical is summed to the respective accumulators, unless the limit is exceeded.
   f. If chemical has commercial annual or cumulative volume limits, the same types of checks and summations are done as in 2e above. Note that research and development vs. commercial limits are generally mutually exclusive.
   g. If a chemical is banned, it is banned in a country, not in an Alliance. Shipments are not allowed if the chemical is banned in the ship-to country.
5. Export Notification Lists 514. The U.S. government has two chemical inventory lists dealing with chemicals that are exported to other countries. One list is the Annual Export Notification List. If a chemical on this list is shipped to any country during the year, the EPA requires a formal notification the first time it is shipped every year. The other list is the One-Time Export Notification List, which means that if a chemical on this list is shipped to any country at any time, the EPA requires a formal notification the first time a manufacturer every records a shipment. These notifications may be sent as automatic faxes to the EPA. The logic can avoid sending false notifications: no notifications are sent if the logic detects any other type of order exception.
6. New York Bulk Shipment List. The state of New York (USA) has a list of chemicals requiring New York customers who store the chemicals in bulk tanks to register the chemical/tank with the state government. If a chemical component is in the NYBS list, then the customer location must be approved for the location to clear the order. Note that customers are linked to the NYBS chemicals even if the customer does not currently store the chemical in a bulk tank. (They may drum the chemical instead.) This is to avoid continually flagging exceptions. In these cases, it is noted that the rule does not apply to the customer's use of the chemical.
7. Sales-Restricted Products 532. A product may be restricted for sale to any customer for regulatory precautions. Since this check applies to the product and not to the chemical components, the Family GMN 520 is flagged for sales restrictions. The customer must be linked to the Family GMN and be approved to allow the sale.
8. Shipping Compatibility 510. If a chemical is to be shipped in compartmentalized tank cars/trucks, then a shipping compatibility check is made for all products on the order. A compatibility matrix of chemical classifications is maintained, specifying which classes 522 are hazardous to mix. The Family GMNs 520 are updated with the proper chemical classifications to allow the checks to be made.

Details of Regulatory Compliance Verifying Block 133

Figure 6A:
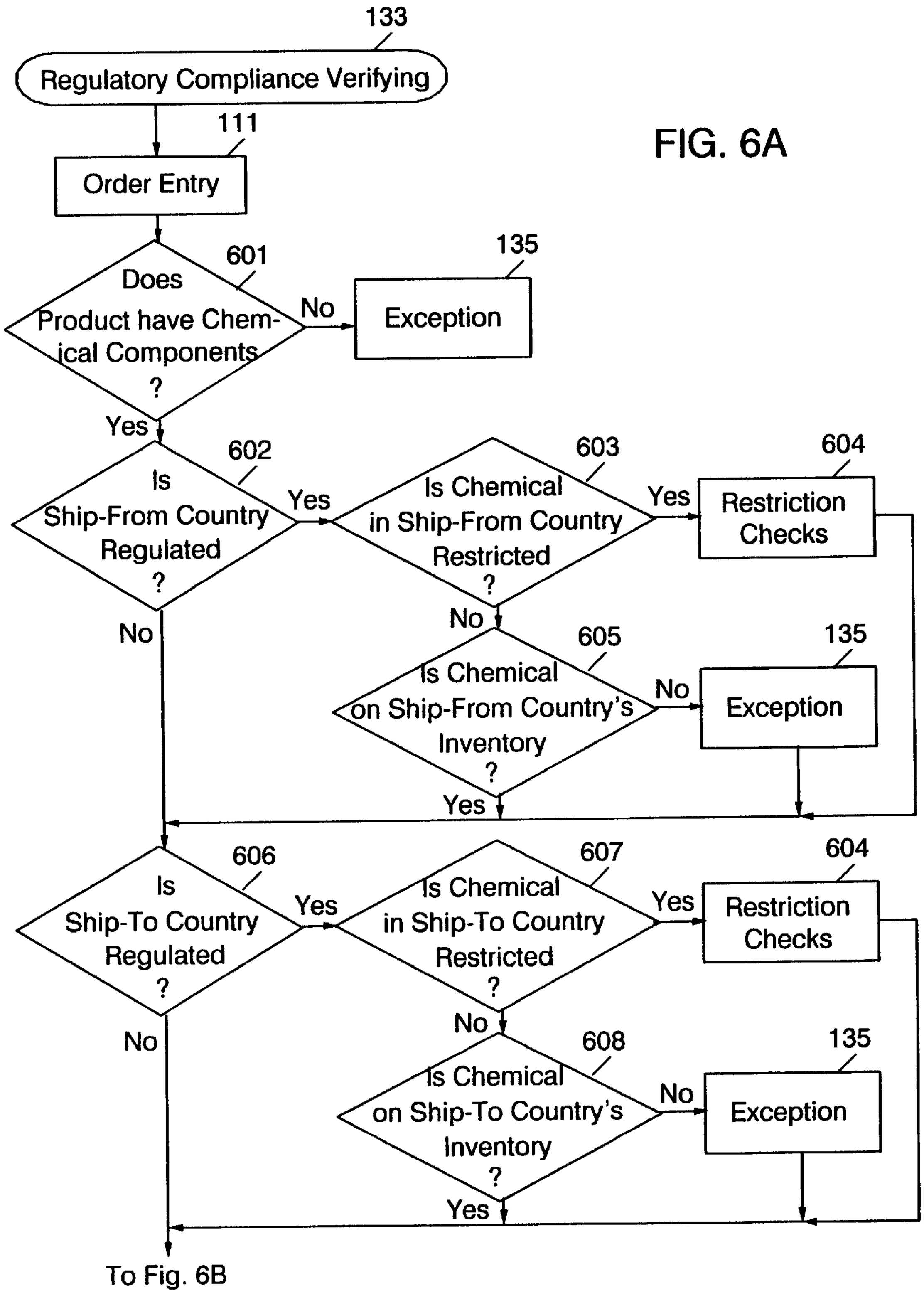
FIGS. 6A, 6B and 6C, which together form FIG. 6 as indicated, illustrate regulatory compliance verifying of FIG. 1.
Figure 6B:
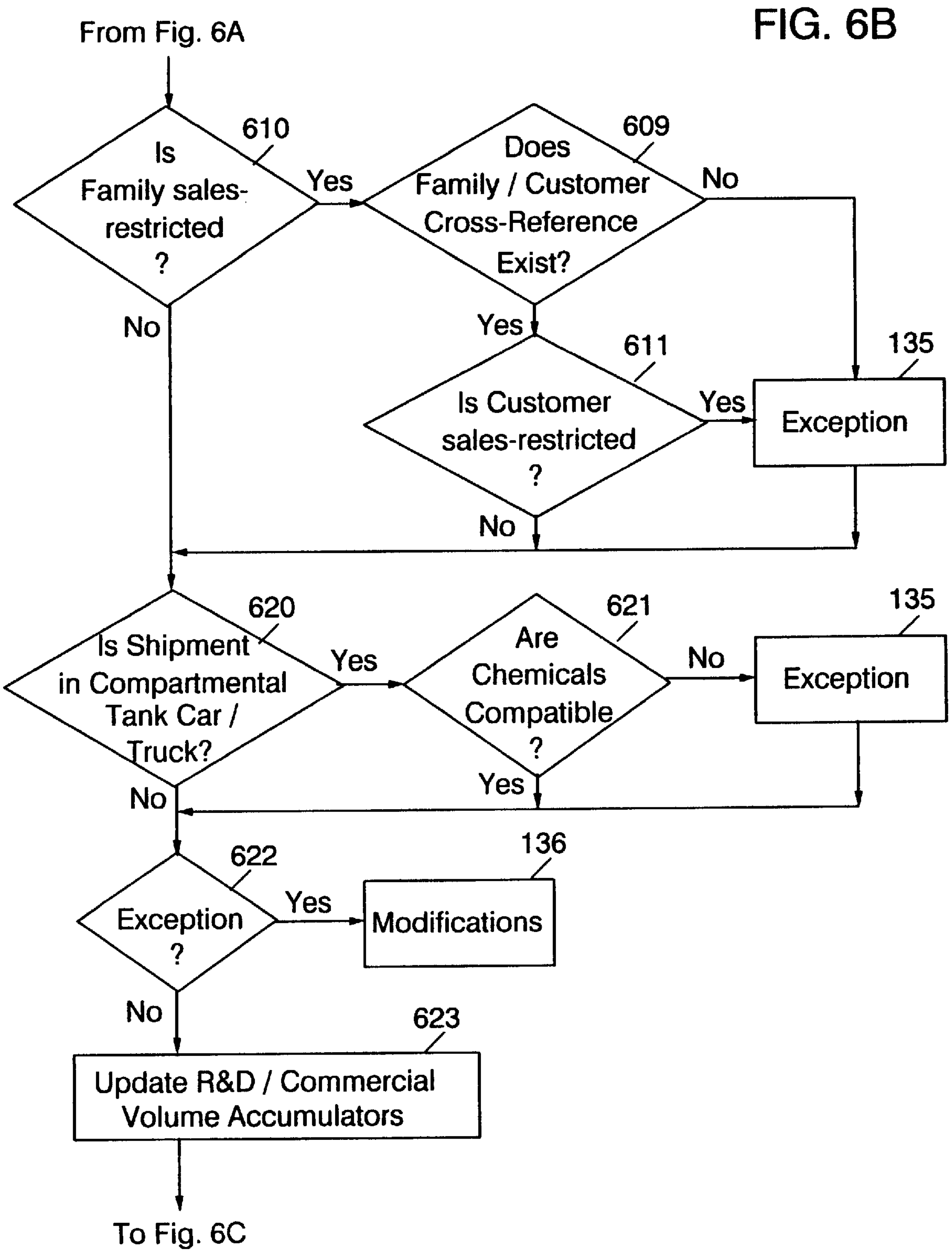
Figure 6C:
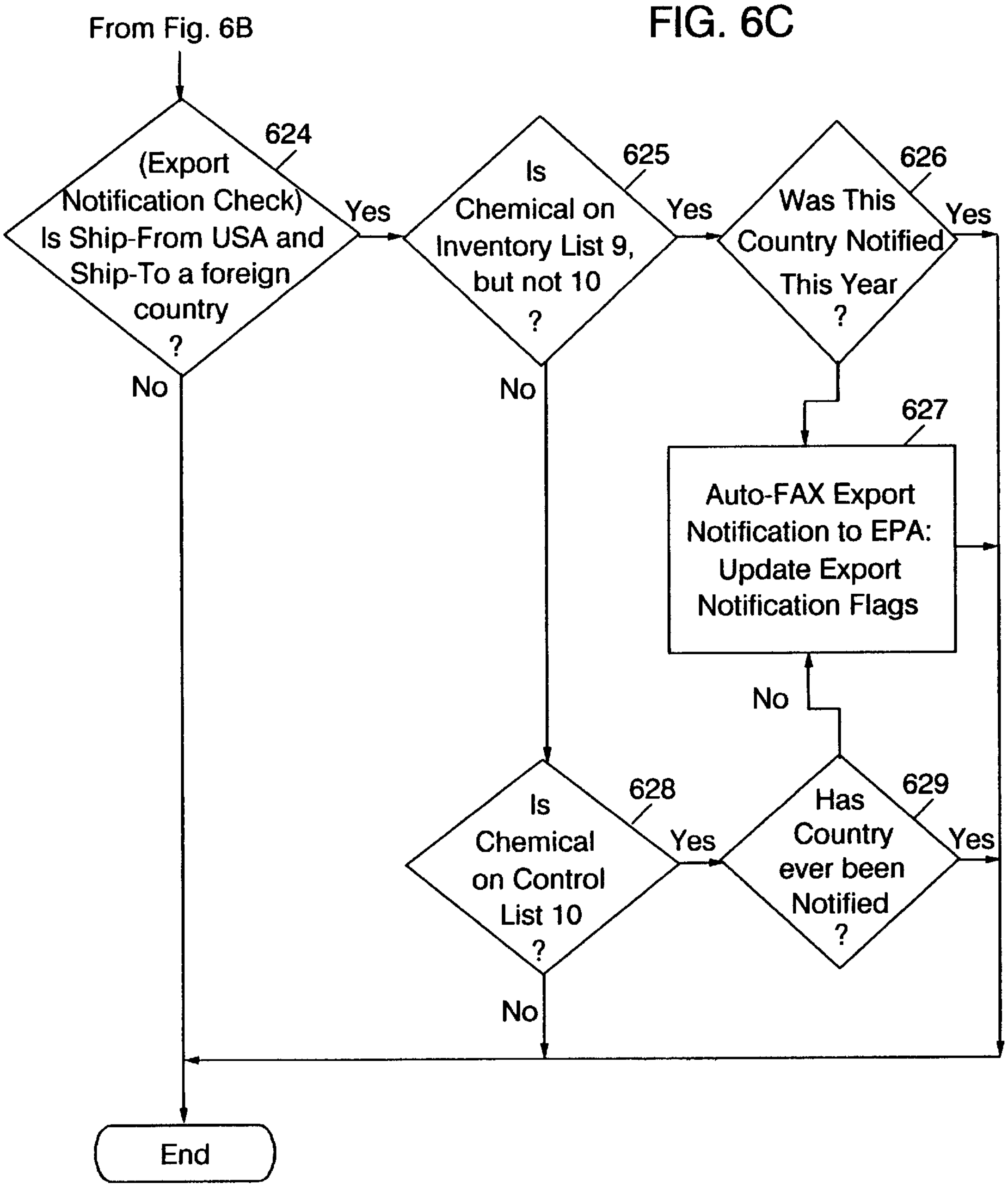

Referring now to FIGS. 6A, 6B and 6C, which together form FIG. 6 as indicated, detailed operations of regulatory compliance verifying 133 of FIG. 1 will now be described. As shown in FIG. 6, in response to an order entry 111, a test is made at Block 601 as to whether the product has chemical components. If NO, an exception is noted (Block 135) and operations end.

Returning to Block 601, if the product has chemical components, then at Block 602 a test is made as to whether the shipped-from country is regulated. This test determines if a country from which the order is shipped is regulated by a law such as TSCA. If the shipped-from country is regulated, then a test is made at Block 603 as to whether a chemical in the shipped-from country is restricted. In particular, countries that have inventories may also exempt some chemicals from inventory listing if they are regulated by other laws enforced at the same time. Examples are chemicals for foods, drugs, cosmetics, pesticides, tobacco, nuclear and chemicals. These are sent for restriction checks at Block 604. Restriction checks will be described in detail in connection with FIG. 7.

If the result of the test of Block 603 is NO, then at Block 604 a test is made as to whether the chemical is on the shipped-from country's inventory. If NO, an exception is issued at Block 135. If YES, then tests are made as to whether the shipped-to country is regulated at Block 606. If YES, then at Block 607, a test is made as to whether the chemical in the shipped-to country is restricted. If YES, restriction checks of FIG. 7 are performed at Block 604. If NO, a test is made as to whether the chemical is on a shipped-to country's inventory at Block 608, and if NO, an exception 135 is produced.

Continuing with the description of FIG. 6, a test is then made at Block 610 as to whether the Family is sales-restricted. In particular, a manufacturer may have many reasons for restricting the sales of certain chemicals to selected customers only. One reason may be toll manufacturing agreements. Other reasons may be restriction on use only to customers who are able to use the chemical safely and only in safe applications. Yet another restriction may be a secrecy agreement. Thus, the sales restrictions may not be based on regulations but rather may be based on a manufacturer's policy.

If the Family is sales restricted at Block 610, a test is made at Block 609 as to whether Family or customer cross-references exist that tie the restriction to a particular customer. If NO, then an exception is created at Block 135. If YES, a test is made at Block 611 as to whether the customer is sales-restricted. If YES, an exception is made at Block 135.

A test is then made at Block 620 as to whether a shipment is going to be made in a compartmental tank car or truck. If YES, a test is made at Block 621 as to whether the chemicals are compatible. If not, an exception is created at Block 135.

The test at Block 622 determines whether an exception has ever been made in any of the above operations. If YES, the exception can be indicated. Alternatively, modifications may be made at Block 136. More specifically, an expert system may be used in conjunction with regulatory compliance verifying Block 133 to suggest modifications to the regulatory bill of materials 122 to make the chemical compliant. For example, substitutions of components in mixtures that are not in the inventory of existing substances for the shipped-to country may be suggested. Alternatively, compositional information in the database may be used to determine the amounts of SARA chemicals on hand or disposed at a plant site. Compositional information can be used to manage reporting of RCRA wastes and EPCRA releases. The compositional information and bills of materials can also be reviewed periodically for opportunities to change to processes that are more environmentally friendly, i.e. "green chemistry". Accordingly, rather than merely flagging an exception, modifications 136 may be proposed.

Continuing with the description of FIG. 6, at Block 623, R&D or commercial volume accumulators are updated as necessary if there were no exceptions. Then, at Block 624, an export notification check is performed by checking whether the chemicals are being shipped from the U.S. to a foreign country. In particular, TSCA Section 12(b) requires that the EPA be notified under certain conditions when specified chemicals are exported for the first time to each country, sometimes annually and sometimes once. See 40 CFR 707.65. Chemicals subject to TSCA Section 4 regulations are notified only once per country. Other chemicals subject to Section 5 or 6 regulations are to be notified each year for each country. Accordingly, a test is made at Block 625 as to which requirement a chemical is subject. If YES, a test is made at Block 626 as to whether this country has been notified yet. If NO, at Block 627, a notification letter is created to produce an export notification to the EPA and export notification flags are updated.

Returning to Block 625, if NO, a test is made at Block 628 as to whether the chemical is on the other control list. If YES, a test is made at Block 629 if the country has ever been notified, and at Block 627 a notification may be sent.

Figure 7A:
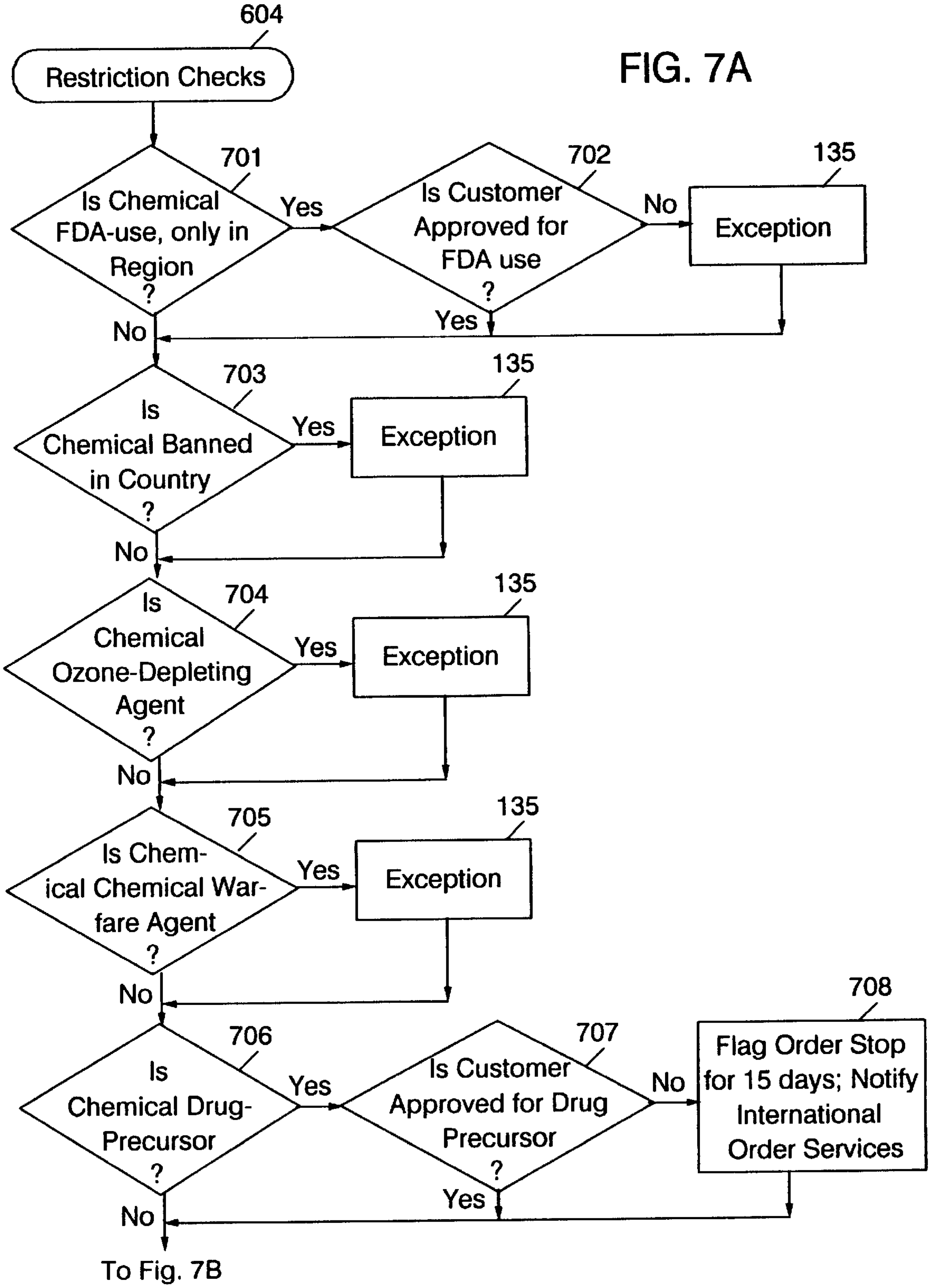
FIGS. 7A and 7B which together form FIG. 7 as indicated, illustrate restriction checks of FIG. 6.
Figure 7B:
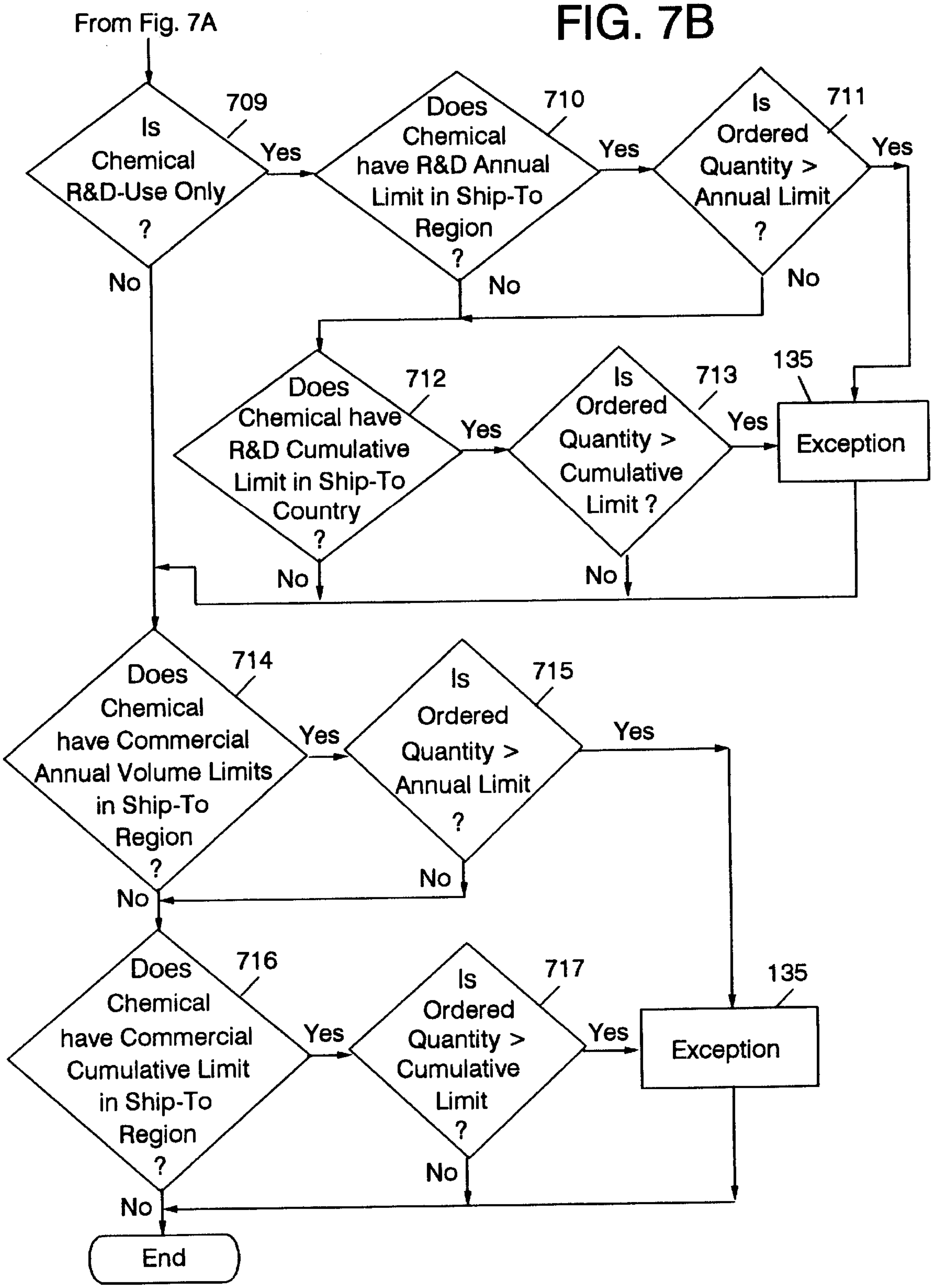

Referring now to FIGS. 7A and 7B, which form FIG. 7 as indicated, operations for restriction checks (Block 604 of FIG. 6) will now be described. At Block 701, a test is made as to whether the chemical is FDA-use only in the region. In particular, chemicals that are used in foods, drugs and cosmetics are regulated by the Federal Food, Drug & Cosmetic Act (FFDCA) in the U.S., and by similar laws in other countries. They are exempt from TSCA and similar laws in other countries. Thus, the check at Block 701 is used to ensure that the customer is ordering such a chemical for use in a food, drug, cosmetic or such applications. The FFDCA regulations are in 21 CFR. If YES at Block 701, a test is made at Block 702 as to whether the customer is approved for FDA use. If not, an exception is created at Block 135.

If the chemical is not for FDA uses only at Block 701, a test is made at Block 703 as to whether a chemical is banned in a country. The only case that is presently in effect is the outright ban of cadmium compounds in Sweden. If YES, an exception is created at Block 135.

Then at Block 704, a test is made as to whether the chemical is an ozone-depleting agent. The Montreal Protocol is an international treaty that proposes to reduce the emissions of ozone-depleting substances, such as some of the freons, from further reducing ozone in the atmosphere. The U.S. regulations are located in 40 CFR §82.

A test is then made at Block 705 as to whether the chemical is a chemical warfare agent. The U.S. recently signed the Chemical Warfare Convention. Implementing legislation has not been implemented yet. Once implemented, it can be used in this test.

Referring now to Block 706, a test is made as to whether the chemical is an essential drug precursor. The Drug Enforcement Administration (Department of Justice) permits the export of certain chemicals that are useful for the manufacture and processing of elicit drugs. See 21 CFR §1307ff. If YES, then at Block 707, a test is made as to whether a customer is approved for a drug precursor chemical. If not, the order is flagged for 15 days at Block 708 and DEA is notified.

Referring now to Block 709, a test is made as to whether the chemical is for R&D use only. TSCA, specifically 40 CFR §710.4(c)(3), exempts certain chemicals from listing on the National Inventory of Commercial Chemical Substances under certain conditions. Other regulations may do the same. Often, the amount of R&D substance which may be manufactured is restricted. See also Canadian Environment Protection Act (CEPA) Section 218(1)(a). At Block 709, if the chemical is R&D-use only, then a test is made at Block 710 as to whether the chemical has R&D annual limits in the shipped-to region. If YES, a test is made at Block 711 as to whether the ordered quantity is greater than the annual limit. If YES, an exception is created at Block 135. If NO, a test is made as to whether the chemical has a cumulative limit in the shipped-to country at Block 712. If YES, a test is made at Block 713 as to whether the ordered quantity exceeds the cumulative limit. If YES, an exception is flagged.

Referring now to Block 714, a test is made as to whether the chemical has commercial manufacture/import limits. The U.S. and Japan do not limit import or manufacture of R&D chemicals, but other regulatory countries may. In addition, Canada and the European Union impose limits on the amount of chemicals that may be manufactured or used for commercial purposes until toxicity and property testing is submitted to the agencies and is approved. These limits are both annual and cumulative. See, for example, EU directive 67/548/EEC. Accordingly, if there is a cumulative limit, then at Block 717, a test is made on the ordered quantity, and if YES, an exception 135 is created.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of determining compliance of a chemical product to be manufactured to government regulations that govern the manufactured product, the method comprising the following steps that are performed in a data processing system:

ascertaining which chemical compositions are present in the chemical product to be manufactured; and comparing the chemical compositions so ascertained to a stored set of government regulatory standards relating to the chemical compositions to determine compliance.

2. A method according to claim 1 wherein the ascertaining step comprises the steps of:

obtaining a bill of materials comprising the chemical components of the chemical product to be manufactured; and deriving from the bill of materials the chemical compositions present in the manufactured chemical product.

3. A method according to claim 2 wherein the deriving step comprises the steps of:

identifying a manufacturing bill of materials that is associated with the chemical product; and creating a regulatory bill of materials from the manufacturing bill of materials.

4. A method according to claim 2:

wherein the obtaining step is preceded by the step of obtaining a customer order for a chemical product; and wherein the obtaining step comprises the step of obtaining a bill of materials for the chemical product corresponding to the customer order.

5. A method according to claim 2:

wherein the following step is performed between the obtaining step and the deriving step:

adding impurities to the bill of materials to represent impurities that are present in the chemical product in addition to the chemical compositions of the manufactured chemical product; and wherein the deriving step comprises the step of deriving from the bill of materials, including the added impurities, the chemical compositions present in the manufactured chemical product including the chemical compositions of the impurities.

6. A method according to claim 2 wherein the following step is performed after the deriving step:

adding impurities to the derived chemical composition to account for impurities that are present in the manufactured chemical product.

7. A method according to claim 1 wherein the comparing step comprises the steps of:

comparing the chemical compositions so ascertained to a stored set of government regulatory standards governing the manufacturing location for the manufactured chemical product; and comparing the chemical compositions so ascertained to a stored set of government regulatory standards governing the destination location for the manufactured chemical product.

8. A method according to claim 1 wherein the ascertaining step comprises the steps of:

obtaining a bill of materials comprising the chemical components of the chemical product to be manufactured;

for each component, assigning a component class to which the component belongs, the component classes selected from the group consisting of bases, additives, reactants and monomers; and determining the chemical compositions from the components and the component classes so assigned.

9. A method according to claim 1 wherein the comparing step is followed by the step of:

proposing modifications to noncomplying chemical products so that the chemical product to be manufactured becomes complying.

10. A method according to claim 1:

wherein the ascertaining step comprises the step of ascertaining which chemical compositions are present in the chemical product including chemical compositions of impurities that are present in the chemical product; and wherein the comparing step comprises the step of comparing the chemical compositions so ascertained including the chemical compositions of the impurities, to a stored set of government regulatory standards to determine compliance.

11. A method according to claim 1 wherein the ascertaining step is performed in response to receipt of a customer order for the chemical product.

12. A method according to claim 1:

wherein the ascertaining step is performed to ascertain which chemical compositions are present in a plurality of chemical products that can be manufactured in a chemical plant; and wherein the ascertaining step further comprises the step of:

in response to a customer order for a chemical product selected from the plurality of chemical products, retrieving the chemical composition that was ascertained for the selected chemical product.

13. A method of deriving chemical compositions that are present in a chemical product to be manufactured, comprising the following steps that are performed in a data processing system:

obtaining a bill of materials comprising the chemical components of the chemical product to be manufactured; and deriving from the bill of materials the chemical compositions present in the manufactured chemical product.

14. A method according to claim 13 wherein the obtaining and deriving steps are performed in response to receipt of a customer order for the chemical product.

15. A method according to claim 13:

wherein the obtaining and deriving steps are performed to ascertain which chemical compositions are present in a plurality of chemical products that can be manufactured in a chemical plant; and wherein the deriving step is followed by the step of:

in response to a customer order for a chemical product selected from the plurality of chemical products, retrieving the chemical composition that was ascertained for the selected chemical product.

16. A method according to claim 13 wherein the deriving step comprises the steps of:

identifying a manufacturing bill of materials that is associated with the chemical product; and creating a regulatory bill of materials from the manufacturing bill of materials.

17. A method according to claim 13:

wherein the obtaining step is preceded by the step of obtaining a customer order for a chemical product; and wherein the obtaining step comprises the step of obtaining a bill of materials for the chemical product corresponding to the customer order.

18. A method according to claim 13 wherein the obtaining step comprises the steps of:

determining a bill of materials comprising the chemical components of the chemical product to be manufactured;

for each component in the bill of materials, assigning a component class to which the component belongs, the component classes selected from the group consisting of bases, additives, reactants and monomers; and wherein the deriving step comprises the step of determining the chemical compositions from the components and the component classes so assigned.

19. A method according to claim 18 wherein the step of determining the chemical compositions from the components and the chemical classes so assigned comprises the step of:

if all the components have a component class of reactants, determining the chemical composition as the products of a reaction of all the components.

20. A method according to claim 18 wherein the step of determining the chemical compositions from the components and the chemical classes so assigned comprises the step of:

if at least one of the components has a component class of monomers, determining at least one polymer that is obtained from polymerization of the at least one monomer.

21. A method according to claim 18 wherein the step of determining the chemical compositions from the components and the chemical classes so assigned comprises the step of:

if none of the components have a component class of reactants or monomers, calculating amounts of chemical compositions in a mixture by summing all the components that appear more than once.

22. A method according to claim 13:

wherein the following step is performed between the obtaining step and the deriving step:

adding impurities to the bill of materials to represent impurities that are present in the chemical product in addition to the chemical compositions of the manufactured chemical product; and wherein the deriving step comprises the step of deriving from the bill of materials, including the added impurities, the chemical compositions present in the manufactured chemical product including the chemical compositions of the impurities.

23. A method according to claim 13 wherein the following step is performed after the deriving step:

adding impurities to the derived chemical composition to account for impurities that are present in the manufactured chemical product.

24. A method according to claim 13 wherein the deriving step comprises the step of ignoring chemical components that are less than a predetermined percentage of the chemical product to be manufactured.

25. A method of determining compliance of chemical compositions of a chemical product to government regulations that govern use or shipment of chemicals, comprising the following steps that are performed in a data processing system:

comparing the chemical compositions to a stored set of government regulatory standards governing the manufacturing location for the manufactured chemical product; and comparing the chemical compositions to a stored set of government regulatory standards governing the destination location for the manufactured chemical product.

26. A method according to claim 25 wherein the comparing steps are followed by the step of:

proposing modifications to noncomplying chemical products so that the chemical product to be manufactured becomes complying.

27. A method according to claim 26 wherein the step of proposing modifications comprises the step of:

using an expert system to propose substitution of a noncomplying chemical composition with a complying chemical composition.

28. A method according to claim 25:

wherein the chemical compositions include chemical compositions of impurities that are present in the chemical product; and wherein each of the comparing steps comprises the step of comparing the chemical compositions including the chemical compositions of the impurities, to a stored set of government regulatory standards to determine compliance.

29. A method according to claim 25 wherein each of the comparing steps comprises the step of comparing the chemical compositions to a stored set of government regulatory standards including at least one of toxic chemical standards, food and drug standards, banned chemical standards, ozone depleting chemical standards, chemical warfare agent standards, drug precursor standards, research and development use standards, and volume limit standards.

30. A method according to claim 25 wherein the step of comparing the chemical compositions to a stored set of government regulatory standards governing the manufacturing location for the manufactured chemical product comprises the step of:

if the manufacturing location and the destination location are in different countries, comparing the chemical compositions to a stored set of export restrictions for the manufacturing location.

31. A method according to claim 30 wherein the step of comparing the chemical compositions to a stored set of export restrictions for the manufacturing location is followed by the step of:

automatically notifying a governmental authority of the proposed export.

32. A method according to claim 25 further comprising the step of:

comparing the chemical compositions to a stored set of contractual agreements of the manufacturer that limit sales or use of the chemical compositions.

33. A method according to claim 25 further comprising the step of:

comparing the chemical compositions to a stored set of shipment compatibility constraints on the chemical compositions.

34. A data processing system for determining compliance of a chemical product to be manufactured to government regulations that govern the manufactured product, the data processing system comprising:

means for ascertaining which chemical compositions are present in the chemical product to be manufactured; and means for comparing the chemical compositions so ascertained to a stored set of government regulatory standards relating to the chemical compositions to determine compliance.

35. A system according to claim 34 wherein the ascertaining means comprises:

means for obtaining a bill of materials comprising the chemical components of the chemical product to be manufactured; and means for deriving from the bill of materials the chemical compositions present in the manufactured chemical product.

36. A system according to claim 35 wherein the deriving means comprises:

means for identifying a manufacturing bill of materials that is associated with the chemical product; and means for creating a regulatory bill of materials from the manufacturing bill of materials.

37. A system according to claim 35:

wherein the obtaining means is responsive to a customer order for a chemical product.

38. A system according to claim 35 further comprising:

means for adding impurities to the bill of materials to represent impurities that are present in the chemical product in addition to the chemical compositions of the manufactured chemical product; and wherein the deriving means comprises means for deriving from the bill of materials, including the added impurities, the chemical compositions present in the manufactured chemical product including the chemical compositions of the impurities.

39. A system according to claim 35 further comprising:

means for adding impurities to the derived chemical composition to account for impurities that are present in the manufactured chemical product.

40. A system according to claim 34 wherein the comparing means comprises:

means for comparing the chemical compositions so ascertained to a stored set of government regulatory standards governing the manufacturing location for the manufactured chemical product; and means for comparing the chemical compositions so ascertained to a stored set of government regulatory standards governing the destination location for the manufactured chemical product.

41. A system according to claim 34 wherein the ascertaining means comprises:

means for obtaining a bill of materials comprising the chemical components of the chemical product to be manufactured;

means for assigning a component class to which each component belongs, the component classes selected from the group consisting of bases, additives, reactants and monomers; and means for determining the chemical compositions from the components and the component classes so assigned.

42. A system according to claim 34 further comprising:

means for proposing modifications to noncomplying chemical products so that the chemical product to be manufactured becomes complying.

43. A system according to claim 34:

wherein the ascertaining means comprises means for ascertaining which chemical compositions are present in the chemical product including chemical compositions of impurities that are present in the chemical product; and wherein the comparing means comprises means for comparing the chemical compositions so ascertained including the chemical compositions of the impurities, to a stored set of government regulatory standards to determine compliance.

44. A system according to claim 34 wherein the ascertaining means is responsive to receipt of a customer order for the chemical product.

45. A system according to claim 34:

wherein the ascertaining means comprises means for ascertaining which chemical compositions are present in a plurality of chemical products that can be manufactured in a chemical plant; and wherein the ascertaining means further comprises:

means for retrieving the chemical composition that was ascertained for the selected chemical product in response to a customer order for a chemical product selected from the plurality of chemical products.

46. A computer program product for determining compliance of a chemical product to be manufactured to government regulations that govern the manufactured product, the computer program product comprising a computer-readable storage medium having computer-readable program code means embodied in the medium, the computer-readable program code means comprising:

computer-readable program code means for ascertaining which chemical compositions are present in the chemical product to be manufactured; and computer-readable program code means for comparing the chemical compositions so ascertained to a stored set of government regulatory standards relating to the chemical compositions to determine compliance.

47. A computer program product according to claim 46 wherein the ascertaining means comprises:

computer-readable program code means for obtaining a bill of materials comprising the chemical components of the chemical product to be manufactured; and computer-readable program code means for deriving from the bill of materials the chemical compositions present in the manufactured chemical product.

48. A computer program product according to claim 47 wherein the deriving means comprises:

computer-readable program code means for identifying a manufacturing bill of materials that is associated with the chemical product; and computer-readable program code means for creating a regulatory bill of materials from the manufacturing bill of materials.

49. A computer program product according to claim 47:

wherein the obtaining means is responsive to a customer order for a chemical product.

50. A computer program product according to claim 47 further comprising:

computer-readable program code means for adding impurities to the bill of materials to represent impurities that are present in the chemical product in addition to the chemical compositions of the manufactured chemical product; and wherein the deriving means comprises computer-readable program code means for deriving from the bill of materials, including the added impurities, the chemical compositions present in the manufactured chemical product including the chemical compositions of the impurities.

51. A computer program product according to claim 47 further comprising:

computer-readable program code means for adding impurities to the derived chemical composition to account for impurities that are present in the manufactured chemical product.

52. A computer program product according to claim 46 wherein the comparing means comprises:

computer-readable program code means for comparing the chemical compositions so ascertained to a stored set of government regulatory standards governing the manufacturing location for the manufactured chemical product; and computer-readable program code means for comparing the chemical compositions so ascertained to a stored set of government regulatory standards governing the destination location for the manufactured chemical product.

53. A computer program product according to claim 46 wherein the ascertaining means comprises:

computer-readable program code means for obtaining a bill of materials comprising the chemical components of the chemical product to be manufactured;

computer-readable program code means for assigning a component class to which each component belongs, the component classes selected from the group consisting of bases, additives, reactants and monomers; and computer-readable program code means for determining the chemical compositions from the components and the component classes so assigned.

54. A computer program product according to claim 46 further comprising:

computer-readable program code means for proposing modifications to noncomplying chemical products so that the chemical product to be manufactured becomes complying.

55. A computer program product according to claim 46:

wherein the ascertaining means comprises computer-readable program code means for ascertaining which chemical compositions are present in the chemical product including chemical compositions of impurities that are present in the chemical product; and wherein the comparing means comprises computer-readable program code means for comparing the chemical compositions so ascertained including the chemical compositions of the impurities, to a stored set of government regulatory standards to determine compliance.

56. A computer program product according to claim 46 wherein the ascertaining means is responsive to receipt of a customer order for the chemical product.

57. A computer program product according to claim 46:

wherein the ascertaining means comprises computer-readable program code means for ascertaining which chemical compositions are present in a plurality of chemical products that can be manufactured in a chemical plant; and wherein the ascertaining means further comprises:

computer-readable program code means for retrieving the chemical composition that was ascertained for the selected chemical product in response to a customer order for a chemical product selected from the plurality of chemical products.

* * * * *